(12) United States Patent
Baik et al.

(10) Patent No.: US 11,988,526 B2
(45) Date of Patent: May 21, 2024

(54) METHOD OF PROVIDING DETAILED MAP DATA AND SYSTEM THEREFOR

(71) Applicant: SAMSUNG ELECTRONICS CO., LTD., Suwon-si (KR)

(72) Inventors: Aron Baik, Suwon-si (KR); Kyunghun Jang, Suwon-si (KR); Inhak Na, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 269 days.

(21) Appl. No.: 16/283,950

(22) Filed: Feb. 25, 2019

(65) Prior Publication Data

US 2019/0265045 A1    Aug. 29, 2019

(30) Foreign Application Priority Data

Feb. 27, 2018   (KR) .................. 10-2018-0023893

(51) Int. Cl.
| | | |
|---|---|---|
| *G01C 21/00* | (2006.01) | |
| *G01C 21/28* | (2006.01) | |
| *G01C 21/34* | (2006.01) | |
| *G01C 21/36* | (2006.01) | |
| *G05D 1/00* | (2006.01) | |

(52) U.S. Cl.
CPC ......... *G01C 21/3889* (2020.08); *G01C 21/28* (2013.01); *G01C 21/3484* (2013.01); *G01C 21/3667* (2013.01); *G01C 21/3841* (2020.08); *G01C 21/3878* (2020.08); *G01C 21/3896* (2020.08); *G05D 1/0274* (2013.01)

(58) Field of Classification Search
CPC ................ G01C 21/28; G01C 21/3667; G01C 21/3484; G01C 21/3833; G01C 21/3602; G01C 21/32; G05D 1/0274; G05D 2201/0213
USPC .......................................................... 701/450
See application file for complete search history.

(56) References Cited

U.S. PATENT DOCUMENTS

| | | | |
|---|---|---|---|
| 8,717,387 B1 | 5/2014 | Brewington | |
| 11,340,628 B2 | 5/2022 | Yu et al. | |
| 2008/0033645 A1 | 2/2008 | Levinson et al. | |
| 2013/0030698 A1 | 1/2013 | Yamagishi et al. | |

(Continued)

FOREIGN PATENT DOCUMENTS

| | | |
|---|---|---|
| CN | 104897161 A | 9/2015 |
| CN | 105956081 A | 9/2016 |

(Continued)

OTHER PUBLICATIONS

Search Report and Written Opinion dated Jun. 5, 2019 in counterpart International Patent Application No. PCT/KR2019/002120.

(Continued)

*Primary Examiner* — Maceeh Anwari
(74) *Attorney, Agent, or Firm* — Nixon & Vanderhye P.C.

(57) ABSTRACT

Provided is a method, performed by a first vehicle, of providing detailed map data, the method including collecting first traveling data about a first path using at least one first sensor while the first vehicle is traveling the first path; obtaining first detailed map data corresponding to the first path based on the first traveling data about the first path; and providing the first detailed map data to at least one external device.

13 Claims, 24 Drawing Sheets

(56) References Cited

U.S. PATENT DOCUMENTS

| | | | |
|---|---|---|---|
| 2014/0088855 A1 | 3/2014 | Ferguson | |
| 2014/0309833 A1 | 10/2014 | Ferguson et al. | |
| 2014/0350854 A1 | 11/2014 | Sugimoto et al. | |
| 2016/0259814 A1* | 9/2016 | Mizoguchi | G06F 16/29 |
| 2017/0176996 A1* | 6/2017 | Ferguson | B60W 30/00 |
| 2017/0192436 A1 | 7/2017 | Min et al. | |

FOREIGN PATENT DOCUMENTS

| | | | |
|---|---|---|---|
| CN | 107727104 A | | 2/2018 |
| JP | 2005-044212 | | 2/2005 |
| JP | 2013-20036 A | | 1/2013 |
| KR | 10-2015-0138394 A | | 12/2015 |
| KR | 20170082165 A | * | 1/2016 |
| KR | 10-2017-0082165 | | 7/2017 |
| WO | 2018/006082 | | 1/2018 |

OTHER PUBLICATIONS

Korean Office Action dated Aug. 26, 2021 for KR Application No. 10-2018-0023893.

Extended European Search Report dated Apr. 28, 2021 for EP Application No. 19760718.7.

European Office Action dated Jan. 19, 2023 for EP Application No. 19760718.7.

Chinese Office Action dated Feb. 10, 2023 for CN Apglication No. 201980015724.4.

Chinese Office Action dated Aug. 7, 2023 for CN Application No. 201980015724.4.

Partial European Search Report and Written Opinion dated Jan. 25, 2021 in corresponding European Application No. 19760718.7.

Chinese Office Action dated Dec. 4, 2023 for CN Application No. 201980015724.4.

\* cited by examiner

FIRST LANE (310) SECOND LANE (320) THIRD LANE (330)

METHOD OF PROVIDING DETAILED MAP DATA AND SYSTEM THEREFOR

CROSS-REFERENCE TO RELATED APPLICATION

This application is based on and claims priority under 35 U.S.C. § 119 to Korean Patent Application No. 10-2018-0023893, filed on Feb. 27, 2018, in the Korean Intellectual Property Office, the disclosure of which is incorporated by reference herein in its entirety.

BACKGROUND

1. Field

The disclosure relates to a method and system for providing detailed map data, based on data obtained by a traveling vehicle.

2. Description of Related Art

As interest in autonomous vehicles increases, technologies related to autonomous traveling are also attracting attention. In order for a vehicle to perform autonomous traveling, technologies for implementing, for example, an operation of perceiving an external environment of the vehicle, an operation of determining a movement and a traveling path of the vehicle required by the external environment of the vehicle, and an operation of controlling a movement of the vehicle using determined information are needed. Although operations have to be combined organically for autonomous traveling, the 'perceiving operation', which serves as the basis for more accurate determination and control, may be deemed the most basic operation of autonomous traveling.

Autonomous vehicles may utilize positioning sensors, such as radars, lidars, cameras, ultrasounds, for the 'perceiving operation'. However, situations in which these positioning sensors cannot be used may occur depending, for example, on weather conditions or road environments. Moreover, due to limits in a perception range, it is not easy to utilize lidars during high-speed traveling.

To supplement perception information based on the aforementioned positioning sensors, detailed map data is used. Because the detailed map data includes information associated with lane information, a stop line location, a traffic light location, etc. in units of very small size (e.g., centimeters (cm)), the detailed map data is able to supplement the 'perceiving operation' of autonomous vehicles. Accordingly, the detailed map data capable of supplementing a perception limitation of a positioning sensor and improving the performance of autonomous traveling is increasingly important.

However, the detailed map data should include information about all traveling paths with precision in units of very small size, and thus a large amount of data should be established. In addition, the detailed map data should rapidly update and reflect dynamically-changing situations of roads. Accordingly, much time is expected to be consumed until reliable autonomous traveling on all roads is realized based on high-quality detailed map data.

Therefore, there is a need for technology capable of rapidly establishing reliable detailed map data for early activation of autonomous traveling and quickly reflecting a dynamic road situation in detailed map data.

SUMMARY

Embodiments of the present disclosure provide a method of establishing reliable detailed map data by obtaining detailed map data, based on traveling data collected for a certain path in which a vehicle repeatedly travels a threshold number of times.

Embodiments of the present disclosure provide a method of providing reliable detailed map data by determining reliability of detailed map data obtained by a vehicle and by providing the detailed map data to an external device when the reliability is equal to or greater than a threshold value.

Embodiments of the present disclosure provide a method of recommending detailed map data satisfying a certain criterion, the detailed map data obtained by a first vehicle, to a second vehicle that requests detailed map data about a certain path.

Additional aspects will be set forth in part in the description which follows and, in part, will be apparent from the description.

In accordance with an example aspect of the disclosure, a method, performed by a first vehicle, of providing detailed map data, includes collecting first traveling data about a first path using at least one first sensor while the first vehicle is traveling the first path; obtaining first detailed map data corresponding to the first path based on the first traveling data about the first path; and providing the first detailed map data to at least one external device.

In accordance with another example aspect of the disclosure, a first vehicle includes a sensing unit configured to collect first traveling data about a first path while the first vehicle is traveling the first path; at least one processor configured to obtain first detailed map data corresponding to the first path based on the first traveling data about the first path; and a communication interface comprising communication circuitry configured to provide the first detailed map data to at least one external device.

In accordance with another example aspect of the disclosure, a computer program product includes a non-transitory computer-readable recording medium, the non-transitory computer-readable recording medium having recorded thereon instructions, which when executed by a processor, control an electronic apparatus of a first vehicle to perform operations including collecting first traveling data about a first path using at least one first sensor while the first vehicle is traveling the first path; obtaining first detailed map data corresponding to the first path based on the first traveling data about the first path; and providing the first detailed map data to at least one external device.

In accordance with another example aspect of the disclosure, a server includes a communication interface comprising communication circuitry configured to receive from a first vehicle a request to approve uploading of first detailed map data corresponding to a first path; at least one processor configured to search for at least one of information about detailed map data corresponding to the first path and information about detailed map data previously uploaded by the first vehicle and to determine whether to approve the uploading of the first detailed map data; and a memory configured to store the first detailed map data when the uploading of the first detailed map data is approved.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
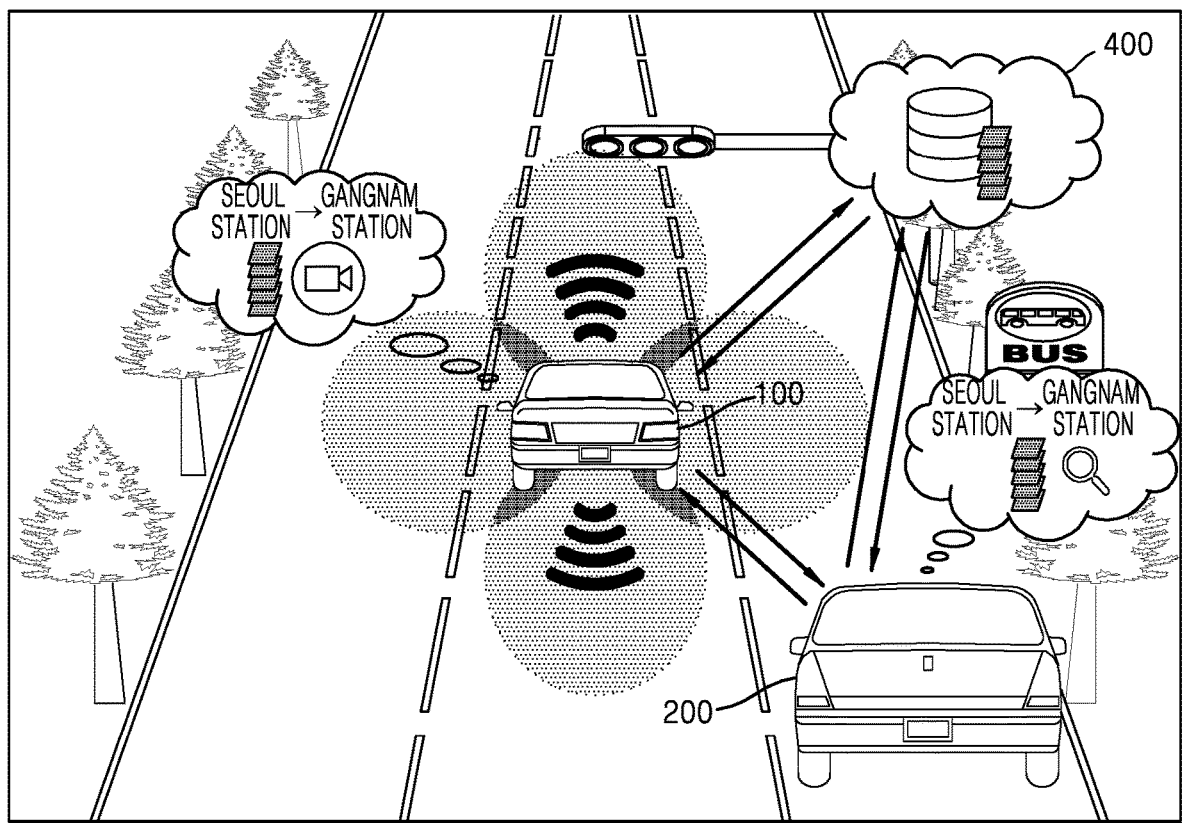
FIG. 1 is a diagram illustrating an example system for providing detailed map data, according to an embodiment.

Hereinafter, the terms used in the disclosure will be briefly described, and then the disclosure will be described in greater detail with reference to the drawings.

Although general terms widely used at present were selected for describing the disclosure in consideration of the functions thereof, these general terms may vary according to intentions of one of ordinary skill in the art, case precedents, the advent of new technologies, and the like. Arbitrarily selected terms may also be used in a specific case. In this case, their meanings can be gleaned from the detailed description. Hence, the terms must be defined based on their meanings and the contents of the entire disclosure, not by simply stating the terms.

The terms "comprises" and/or "comprising" or "includes" and/or "including" when used in this disclosure, specify the presence of stated elements, but do not preclude the presence or addition of one or more other elements. The terms "unit", "-er (-or)", and "module" when used in this disclosure refers to a unit in which at least one function or operation is performed, and may be implemented as hardware, software, or a combination of hardware and software.

Throughout the disclosure, a communication method may include a communication method via a predetermined communication standard, a predetermined frequency band, a predetermined protocol, and/or a predetermined channel. Examples of the communication method may include, but are not limited to, a communication method via wireless LAN (Wi-Fi), Bluetooth, Bluetooth Low energy (BLE), Wi-Fi Direct (WFD), Ultra Wideband (UWB), near field communication (NFC), Ant+, ZigBee, 3G, 4G, LTE, ultrasound, an Infrared Data Association (IrDA)communication method, and a communication method using sound, or the like.

Embodiments of the disclosure are described in detail herein with reference to the accompanying drawings so that this disclosure may be easily understood by one of ordinary skill in the art to which the disclosure pertains. The disclosure may, however, be embodied in many different forms and should not be understood as being limited to the embodiments set forth herein. In the drawings, parts irrelevant to the description may be omitted for simplicity of explanation, and like numbers refer to like elements throughout.

The disclosure will now be described in greater detail with reference to the accompanying drawings, in which example embodiments of the disclosure are illustrated.

FIG. 1 is a diagram illustrating an example system for providing detailed map data, according to an embodiment.

According to an embodiment, the system for providing detailed map data (hereinafter, the system) may include, but is not limited to, a first vehicle 100, a second vehicle 200, and a server 400. According to an embodiment, the detailed map may be referred as a High Definition (HD) map or a precise digital map.

The first vehicle 100 may be a vehicle that generates detailed map data. For example, the first vehicle 100 may collect traveling data while traveling a certain path (e.g., a commuting path) using at least one sensor, and may generate detailed map data using the collected traveling data. The at least one sensor may, for example, be, but is not limited to, at least one of a global positioning system (GPS), an inertial measurement unit (IMU), a Radio Detecting And Ranging (RADAR) sensor, a Light Detecting And Ranging (LIDAR) sensor, an image sensor, a temperature/humidity sensor, an infrared sensor, an ultrasound sensor, a proximity sensor, an RGB sensor, a magnetic sensor, an acceleration sensor, a gyroscopic (gyro) sensor, or the like. The traveling data may, for example, include, but is not limited to, data including images, sensing information, measurement information, etc. obtained using at least one sensor mounted on the first vehicle 100 while the first vehicle 100 is traveling a certain path.

According to an embodiment, the detailed map data may include, for example, and without limitation, overall information necessary for determination for controlling an operation of an autonomous vehicle. For example, the detailed map data may include, but is not limited to, basic road information, surrounding environment information, detailed road environment information (e.g., a pitch of a topography and a curvature thereof), dynamically-changing road situation information (traffic jam, accident sections, and construction sections), or the like.

The detailed map data may, for example, include map information that realizes roads and surrounding environments thereof in a three-dimensional (3D) manner within an error range of a very small size (for example, a unit of 'cm').

The first vehicle 100 may include at least one communication interface including various communication circuitry for communicating with an external device. For example, the first vehicle 100 may include a first communication interface for transmitting detailed map data generated for a certain path to the second vehicle 200. The first vehicle 100 may include a second communication interface including various communication circuitry for transmitting the detailed map data generated for the certain path to the server 400.

According to an embodiment, the first vehicle 100 may verify reliability of the generated detailed map data. When the reliability is greater than a threshold value, the first vehicle 100 may transmit the detailed map data to the server 400 and/or the second vehicle 200.

For example, the first vehicle 100 may generate detailed map data of a path from the Seoul station to the Gangnam station, based on traveling data collected through traveling from the Seoul station to the Gangnam station. In this example, according to an embodiment, the first vehicle 100 may provide a surrounding vehicle with the detailed map data of the path from the Seoul station to the Gangnam station using, for example, a short-range communication method. For example, the first vehicle 100 may provide detailed map data corresponding to the path from the Seoul station to the Gangnam station to the second vehicle 200 using a Vehicle to Vehicle (V2V) communication technique (e.g., dedicated short-range communications (DSRC)), Wireless Access in Vehicular Environments (WAVE), or the like). According to another embodiment, the first vehicle 100 may transmit (or upload) the detailed map data corresponding to the path from the Seoul station to the Gangnam station to the server 400.

According to an embodiment, the first vehicle 100 may be a vehicle that receives detailed map data corresponding to a certain path. For example, the second vehicle 200 may request the first vehicle 100 and/or the server 400 for detailed map data corresponding to a certain path, and may receive the detailed map data corresponding to the certain path from the first vehicle 100 and/or the server 400. The second vehicle 200 may receive broadcast detailed map data corresponding to a certain path from the first vehicle 100. In this example, the second vehicle 200 may be, but is not limited to, a vehicle positioned around the first vehicle 100.

The server 400 may manage detailed map data corresponding to a certain path, the detailed map data being uploaded from at least one first vehicle 100. For example, the server 400 may classify pieces of detailed map data by vehicle that provided detailed map data, time, context, reliability, or the like, and manage the classified pieces of detailed map data.

According to an embodiment, the server 400 may verify reliability of the detailed map data, and may provide a feedback or reward to the first vehicle 100 having provided the detailed map data, based on the reliability.

According to an embodiment, the server 400 may be requested by at least one second vehicle 200 to provide detailed map data corresponding to a certain path. In this example, the server 400 may recommend detailed map data to the second vehicle 200 based on a certain criterion. The certain criterion may, for example, be, but is not limited to, the type of the second vehicle 200, a current time zone (e.g., the dawn, the day time, or the evening), the type of a sensor mounted on the second vehicle 200, or the like.

According to an embodiment, the server 400 may generate detailed map data corresponding to a longer path than an existing path using a plurality of pieces of detailed map data collected by a plurality of vehicles. The server 400 may generate a global map by connecting the plurality of pieces of detailed map data collected by the plurality of vehicles with each other. The global map may refer, for example, to a piece of global detailed map data corresponding to roads around the world.

According to disclosed embodiments, when a plurality of vehicles collaboratively generate and share detailed map data, establishment of detailed map data necessary for autonomous traveling may be accelerated.

According to various disclosed example embodiments, more accurate detailed map data may be established via a certain verifying operation with respect to reliability of the detailed map data provided by the at least one first vehicle 100.

According to various disclosed example embodiments, reliable detailed map data for a repeatedly traveled path may be provided. A method in which the first vehicle 100 provides detailed map data about a repeatedly traveled path will now be described in greater detail below with reference to FIG. 2.

Figure 2:
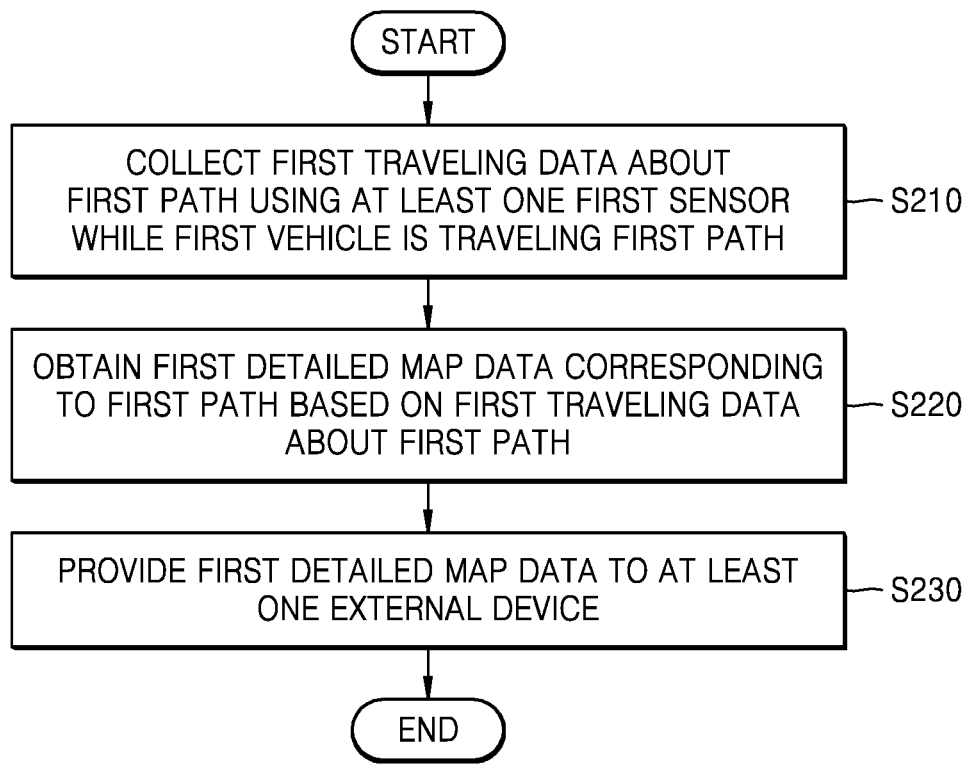
FIG. 2 is a flowchart illustrating an example method, performed by a first vehicle, of obtaining and providing detailed map data, according to an embodiment.

FIG. 2 is a flowchart illustrating an example method, performed by the first vehicle 100, of obtaining and providing detailed map data, according to an embodiment.

Referring to FIG. 2, in operation S210, the first vehicle 100 may collect first traveling data about a first path using at least one first sensor while traveling the first path.

While traveling the first path, the first vehicle 100 may collect first traveling data including, for example, and without limitation, a traveling image, sensing information, measurement information, etc. of the first path, using at least one first sensor mounted on the first vehicle 100. The traveling image may refer, for example, to an image of the surroundings of the first vehicle 100, the image obtained using the at least one first sensor while the first vehicle 100 is traveling the first path. The sensing information may include, for example, and without limitation, information obtained by sensing objects, obstacles, road infrastructures of the surroundings of the first vehicle 100, or the like, the information obtained using the at least one first sensor while the first vehicle 100 is traveling the first path. The measurement information may include, for example, and without limitation, information obtained by measuring a distance between the first vehicle 100 and a neighboring vehicle, a speed of the neighboring vehicle, sizes and locations of road infrastructures around the first vehicle 100, or the like, using the at least one first sensor while the first vehicle 100 is traveling the first path.

The at least one first sensor mounted on the first vehicle 100 may be, but is not limited to, at least one of a GPS, an IMU, a RADAR sensor, a LIDAR sensor, an image sensor (e.g., a front camera or an around view camera), a temperature/humidity sensor, an infrared sensor, an ultrasound sensor, a proximity sensor, an RGB sensor, a magnetic sensor, an acceleration sensor, a gyro sensor, or the like.

For example, the first vehicle 100 may recognize a surrounding environment of the first vehicle 100 at 360° using an image sensor. The first vehicle 100 may obtain lanes, stop lines, and road sign information from a front camera and an around view camera, and may obtain information about neighboring vehicles, obstacles, and road structures from a RADAR sensor or a LIDAR sensor.

The first path may include, for example, a path in which the first vehicle 100 repeatedly traveled a threshold number of times or more. For example, the first path may include a path in which a user of the first vehicle 100 repeatedly travels, such as, for example, a commuting path.

The first vehicle 100 may repeatedly collect first traveling data every time the first vehicle 100 travels the first path. The first vehicle 100 may collect the first traveling data about the first path in various traveling environments by repeatedly collecting the first traveling data about the first path at different time points. For example, the first vehicle 100 may collect first traveling data about the first path at various time zones, such as the morning rush hour, the evening rush hour, and the lunch hour. The first vehicle 100 may collect the first traveling data about the first path at various weathers, such as a foggy weather, a rainy weather, a snowy weather, and a fine weather.

According to an embodiment, the first vehicle 100 may repeatedly collect the first traveling data about the first path every time the first vehicle 100 travels the first path for a threshold number of times. For example, the threshold number of times may be set by a user, and/or determined based on a result of repetitive machine learning.

According to another embodiment, the first vehicle 100 may repeatedly collect the first traveling data about the first path every time the first vehicle 100 travels the first path until a certain criterion is satisfied. For example, the certain criterion may include, but is not limited to, whether the first traveling data at a certain time zone has been collected, whether the first traveling data on a certain weather has been collected, whether the first traveling data on a certain lane has been collected, etc.

According to another embodiment, the first vehicle 100 may collect the first traveling data about the first path in collaboration with another vehicle. For example, the first vehicle 100 may obtain traveling data about a portion of the first path from a third vehicle that is traveling a path included in the first path on a different lane from the first vehicle 100. This will be described in greater detail below with reference to FIG. 3B.

In operation S220, the first vehicle 100 may obtain first detailed map data corresponding to the first path based on the first traveling data about the first path.

The first vehicle 100 may obtain first detailed map data including, for example, and without limitation, map information, road environment information, road situation information, etc. representing roads and their surrounding environments on the first path, based on the first traveling data about the first path (e.g., measurement information about road structures, lanes, stop lines, and road sign information on the first path).

According to an embodiment, the first vehicle 100 may store the first traveling data collected while traveling the first path, in a memory, and may obtain the first detailed map data about the first path, based on the first traveling data stored in the memory after the traveling is completed. According to another embodiment, the first vehicle 100 may obtain the first detailed map data corresponding to the path in real time, using the first traveling data collected while traveling the first path.

According to an embodiment, the first vehicle 100 may generate the first detailed map data, based on the first traveling data about the first path. According to another embodiment, the first vehicle 100 may obtain the first detailed map data about the first path by providing the first traveling data about the first path to another device connected to the first vehicle 100 and receiving the first traveling data generated by the other device.

The first detailed map data according to an embodiment may include information about at least one first sensor used to collect the first traveling data. For example, the first detailed map data may include, but is not limited to, the type of the first sensor used to collect the first traveling data, the number of first sensors, a location on the first vehicle 100 where the first sensor is mounted, the specification of the first sensor, or the like.

The first detailed map data according to an embodiment may also include generation history information about the first detailed map data. The generation history information may include, but is not limited to, at least one of the number of times the first path is traveled to obtain the first detailed map data, a traveling environment during collection of the first traveling data (for example, the weather, whether there is traffic jam, and a time zone), the date when the first detailed map data is updated last, a reliability value of the first detailed map data, or the like.

In operation S230, the first vehicle 100 may provide the first detailed map data to at least one external device. The at least one external device may include, but is not limited to, an external vehicle, an external server, an external mobile device, or the like.

According to an embodiment, the first vehicle 100 may determine reliability of the obtained first detailed map data, and, when the determined reliability is equal to or greater than a threshold value, may provide the first detailed map data to an external device. When the determined reliability is less than the threshold value, the first vehicle 100 may update the first detailed map data, based on additional traveling data. The operation of determining reliability of the first detailed map data will be described in greater detail below with reference to FIGS. 5 and 6.

According to an embodiment, the first vehicle 100 may provide the first detailed map data about the first path to the second vehicle 200, which is currently traveling within a certain distance from the first vehicle 100, based, for example, on V2V communication. The operation, performed by the first vehicle 100, of providing the first detailed map data about the first path to the second vehicle 200 will be described in greater detail below with reference to FIGS. 9 and 10.

According to an embodiment, the first vehicle 100 may provide the first detailed map data about the first path to a plurality of vehicles via the server 400 by uploading the first detailed map data to the server 400. The first vehicle 100 providing the first detailed map data about the first path to a plurality of vehicles via the server 400 will be described in greater detail below with reference to FIGS. 11-15.

Figure 3A:
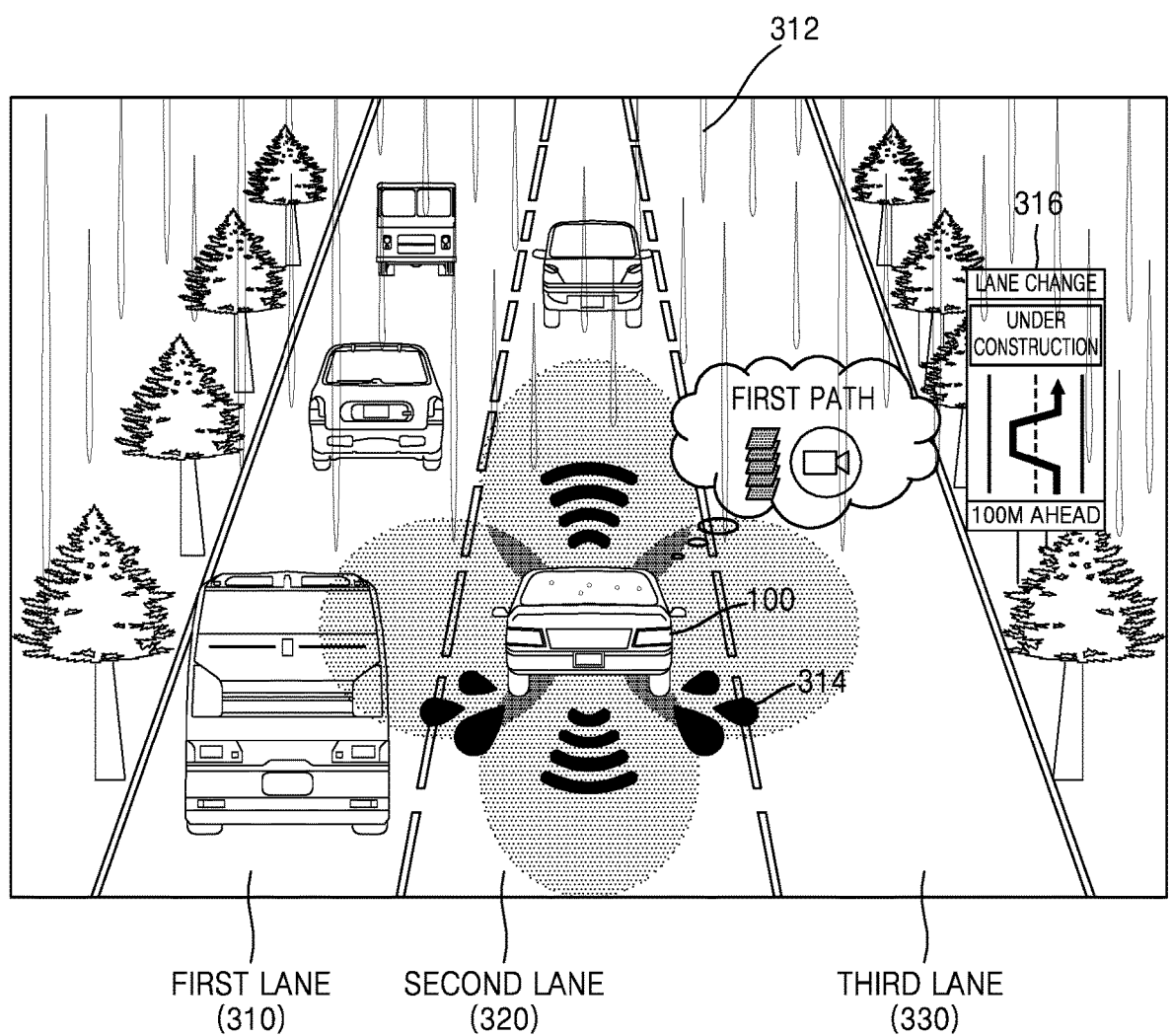
FIGS. 3A and 3B are diagrams illustrating an example operation, performed by the first vehicle, of obtaining traveling data, according to an embodiment.
Figure 3B:
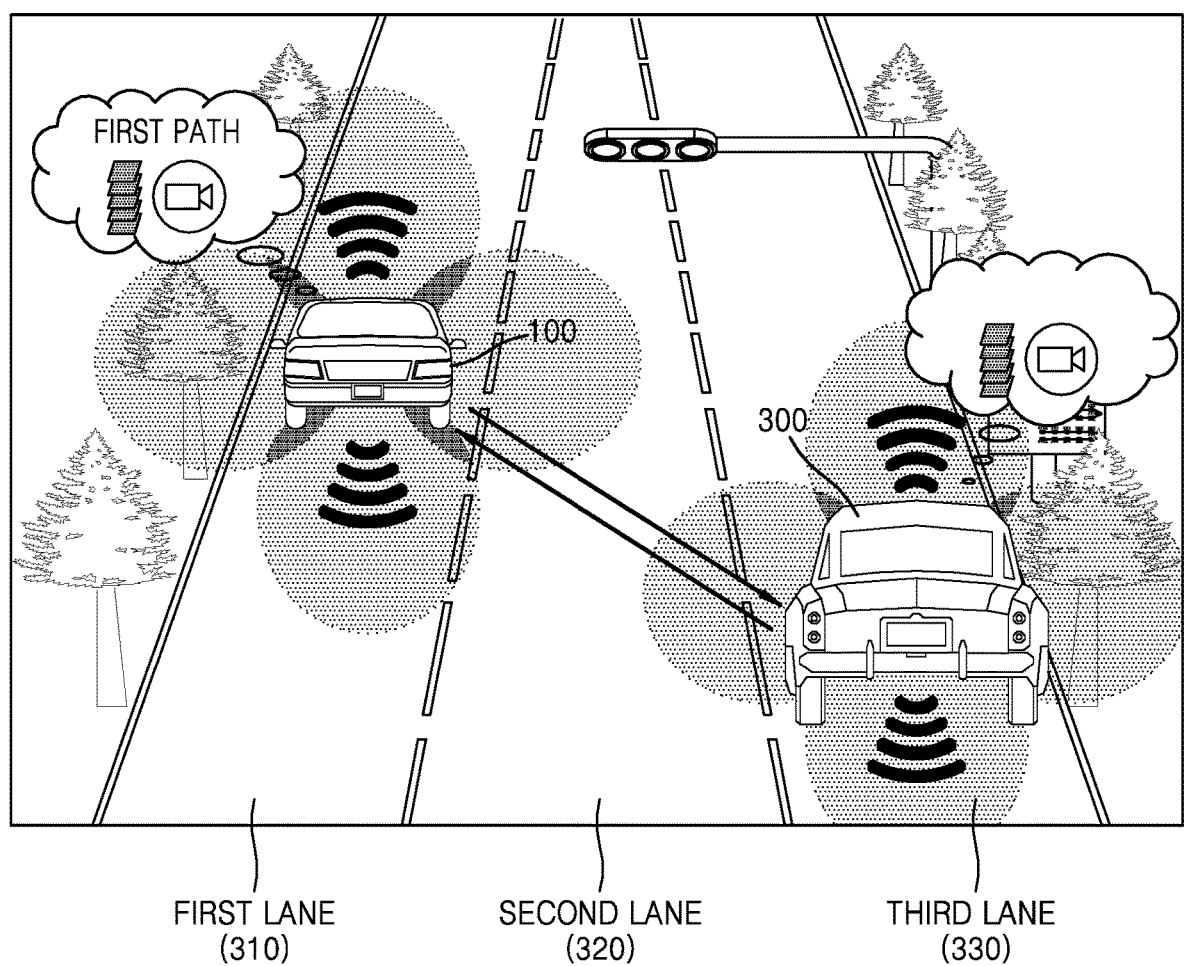

FIGS. 3A and 3B are diagrams illustrating an example operation, performed by the first vehicle 100, of obtaining traveling data, according to an embodiment. FIGS. 3A and 3B illustrate an example in which the first vehicle 100 repeatedly travels the first path.

FIG. 3A illustrates an example in which the first vehicle 100 obtains the first traveling data about the first path while traveling the first path. The first vehicle 100 may collect the first traveling data using at least one first sensor mounted on the first vehicle 100.

For example, the first vehicle 100 may collect first traveling data including, for example, and without limitation, data about the lanes of the roads included in the first path, data about road surface states of the first path, data about a traveling environment while the first vehicle 100 is traveling the first path, or the like.

Referring to FIG. 3A, the first vehicle 100 may collect data about a lane representing that a road on which the first vehicle 100 is traveling is a three-lane road including a first lane 310, a second lane 320, and a third lane 330 using the at least one first sensor. The first vehicle 100 may collect data representing that the lane used when the first vehicle 100 collects the first traveling data is the second lane 320 using the at least one first sensor.

The first vehicle 100 may collect traffic situation data representing that many vehicles travel on the first lane 310 compared with the second lane 320 and the third lane 330 and accordingly traveling on the first lane 310 is not smooth using the at least one first sensor.

The first vehicle 100 may collect data about a traveling environment representing that, when a weather while the first vehicle 100 is traveling a road included in the first path is a rainy weather 312, the surface of the road included in the first path is slippery as indicated by reference numeral 314 using the at least one first sensor.

The first vehicle 100 may also collect data about a traveling environment representing that a portion of the road included in the first path is under construction as indicated, for example, by reference numeral 316 using the at least one first sensor.

Although examples in which the first vehicle 100 according to an embodiment obtains the first traveling data about the first path using at least one first sensor have been described above with reference to FIG. 3A, disclosed elements are not limited thereto. The first vehicle 100 may collect first traveling data including various pieces of data not included in the aforementioned examples using the at least one first sensor.

FIG. 3B illustrates an example in which the first vehicle 100 collects the first traveling data about the first path in collaboration with a third vehicle 300.

The first vehicle 100 may collect the first traveling data by repeatedly using lanes that are always used, while repeatedly traveling the first path. Accordingly, first traveling data about a lane repeatedly used by the first vehicle 100 has a lot of data and is relatively accurate, but first traveling data about a lane on the first path that is usually not used by the first vehicle 100 may have a small amount of data and may be relatively inaccurate.

Accordingly, the first vehicle 100 may request the third vehicle 300 currently traveling a path included in the first path but on a different lane from the first vehicle 100, to provide third traveling data about the path included in the first path.

Referring to FIG. 3B, the first vehicle 100 according to an embodiment may be traveling a path included in the first path on the first lane 310. According to an embodiment, the third vehicle 300 may be traveling the path included in the first path on the third lane 330. The third vehicle 300 may be a vehicle that travels the first path, like the first vehicle 100, but embodiments are not limited thereto. The third vehicle 300 may be a vehicle that is traveling a path including the first path. The third vehicle 300 may be a vehicle that collects (1-2)th traveling data using at least one third sensor while traveling the path included in the first path.

According to an embodiment, the first vehicle 100 may sense the third vehicle 300 currently traveling on the third lane 330. The first vehicle 100 may request the third vehicle 300 currently traveling within a certain distance from the first vehicle 100 for the (1-2)th traveling data, based on V2V communication. The first vehicle 100 may receive the (1-2)th traveling data from the third vehicle 300.

According to another embodiment, the first vehicle 100 may obtain identification information of the sensed third vehicle 300. The identification information may be, for example, and without limitation, a network identifier (ID) of the third vehicle 300, a network ID of a user of the third vehicle 300, or the like. After traveling of the first vehicle 100 is completed, the first vehicle 100 may search for the third vehicle 300 on a network, based on the obtained ID information. The first vehicle 100 may request the third vehicle 300 for the (1-2)th traveling data, based on a wireless network. The first vehicle 100 may receive the (1-2)th traveling data from the third vehicle 300.

Figure 4:
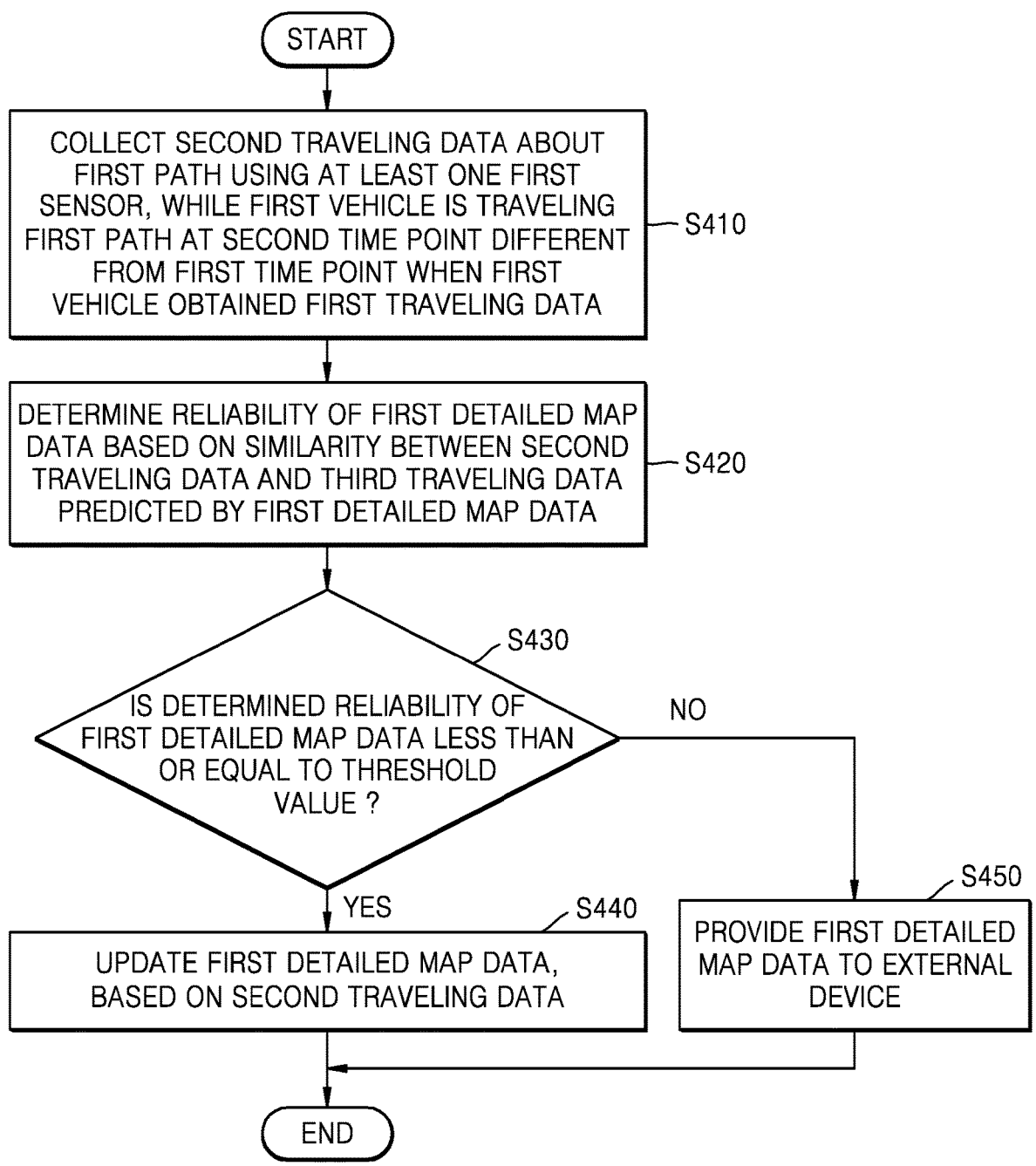
FIG. 4 is a flowchart illustrating an example method, performed by the first vehicle, of determining reliability of obtained detailed map data, according to an embodiment.

FIG. 4 is a flowchart illustrating an example method in which the first vehicle 100 determines reliability of obtained detailed map data, according to an embodiment.

The operations illustrated in FIG. 4 may be operations included in operation S230 described above with reference to FIG. 2.

Referring to FIG. 4, in operation S410, the first vehicle 100 may collect second traveling data about the first path using the at least one first sensor, while traveling the first path at a second time point different from a first time point when the first vehicle 100 obtained the first traveling data.

According to an embodiment, the first vehicle 100 may collect the second traveling data in a traveling environment similar to a traveling environment where the first traveling data is collected. For example, when the first vehicle 100 collected the first traveling data at a day time zone and collected the second traveling data at a night time zone, because different types of first sensors and different sensitivities of first sensors may be used according to different intensities of light, the first traveling data may be greatly different from the second traveling data. Accordingly, reliability of the first detailed map data determined based on the second traveling data collected in a traveling environment different from that for the first traveling data by the first vehicle 100 may be inaccurate.

Accordingly, the first vehicle 100 according to an embodiment may collect the second traveling data in a traveling environment that is the same as or similar to the traveling environment where the first traveling data is collected. For example, the first vehicle 100 may collect the second traveling data at a night time zone or a dawn time zone in order to determine reliability of the first detailed map data obtained based on the first traveling data collected at the night time zone.

According to an embodiment, the first vehicle 100 may consider generation history information of the first detailed map data in order to collect the second traveling data. For example, the first vehicle 100 may collect the second traveling data under a traveling condition that is the same as or similar to a collection environment for the first traveling data, in consideration of, for example, the time zone of the first time point when the first vehicle 100 collected the first traveling data, the type of a lane used by the first vehicle 100 to collect the first traveling data, and the weather upon collecting the first traveling data.

In operation S420, the first vehicle 100 may determine the reliability of the first detailed map data, based on similarity between the second traveling data and third traveling data predicted by the first detailed map data.

According to an embodiment, the first vehicle 100 may theoretically predict third traveling data that may be obtained while traveling the first path at the second time point when the second traveling data was collected, based on the first detailed map data. Because the first detailed map data is generated based on the first traveling data, the third traveling data may be almost similar to the first traveling data. For example, when the second traveling data was collected while the first vehicle 100 is actually traveling from the Seoul station to the Gangnam station at midnight, the first vehicle 100 may calculate (determine) the third traveling data expected to be collected when the first vehicle 100 travels from the Seoul station to the Gangnam station at midnight, using the first detailed map data.

According to an embodiment, the first vehicle 100 may compare the second traveling data collected in real time with the third traveling data predicted by the first detailed map data. The first vehicle 100 may determine reliability of the first detailed map data based on a degree to which the third traveling data is identical with the second traveling data. For example, when the second traveling data is highly identical with the third traveling data, the first vehicle 100 may determine the reliability to be high, and, when the second traveling data is poorly identical with the third traveling data, the first vehicle 100 may determine the reliability to be low. Consistency between the second traveling data and the third traveling data may be proportional to the reliability of the first detailed map data, but embodiments are not limited thereto. For example, second traveling data indicating that there is an overpass in a point A may be collected while the first vehicle 100 is actually traveling from the Seoul station to the Gangnam station at midnight. In this example, when the third traveling data predicted by the first detailed map data also include information indicating that there is an overpass in the point A, the first vehicle 100 may determine that the first detailed map data has a high reliability. When the third traveling data predicted by the first detailed map data does not include the information indicating that there is an overpass in the point A, the first vehicle 100 may down-regulate the reliability of the first detailed map data.

According to another embodiment, the first vehicle 100 may autonomously travel the first path, based on the first detailed map data, and may receive a feedback input with respect to the first detailed map data from a user of the first vehicle 100. The first vehicle 100 may determine the reliability of the first detailed map data, based on the feedback input of the user. For example, the feedback input of the user may include a satisfaction score. When a satisfaction score input by the user is high, the first vehicle 100 may determine the reliability to be high, and, when the satisfaction score input by the user is low, the first vehicle 100 may determine the reliability to be low. The first vehicle 100 may determine the reliability in proportion to the satisfaction score input by the user, but embodiments are not limited thereto.

In operation S430, the first vehicle 100 may determine whether the determined reliability of the first detailed map data is less than or equal to a threshold value.

The first vehicle 100 may compare a predetermined threshold value (e.g., 90%) with the reliability of the first detailed map data. The predetermined threshold value may be a value input by the user of the first vehicle 100, a value obtained by the first vehicle 100 from an external device, or a value obtained as a result of repetition of machine learning by the first vehicle 100.

In operation S440, when the reliability of the first detailed map data is less than or equal to the threshold value, the first vehicle 100 may update the first detailed map data, based on the second traveling data.

In operation S450, when the reliability of the first detailed map data exceeds the threshold value, the first vehicle 100 may provide the first detailed map data to an external device.

According to an embodiment, when the reliability of the first detailed map data exceeds the threshold value, the first vehicle 100 may request the server 400 to upload the first detailed map data. According to another embodiment, when the reliability of the first detailed map data exceeds the threshold value, the first vehicle 100 may transmit the first detailed map data to a neighboring vehicle that requests the first detailed map data, by broadcasting information about the first detailed map data.

The operation, performed by the first vehicle 100 of providing the first detailed map data to an external device has been described above in operation S230 of FIG. 2, and thus a detailed description thereof will not be repeated here.

Although an example in which, when the reliability of the first detailed map data is less than or equal to the threshold value, the first vehicle 100 updates the first detailed map data has been illustrated in FIG. 4, embodiments are not limited thereto. For example, when the second traveling data is collected at the second time point different from the first time point, the first vehicle 100 may update the first detailed map data, based on the second traveling data regardless of the reliability of the first detailed map data. According to another embodiment, when at least a predetermined number (e.g., 10) of pieces of traveling data are obtained at a time point different from the first time point, the first vehicle 100 may update the first detailed map data, based on the obtained traveling data. The first vehicle 100 may update the first detailed map data at certain intervals. For example, the first vehicle 100 may update the first detailed map data at intervals of one week, based on traveling data collected for one week.

Figure 5:
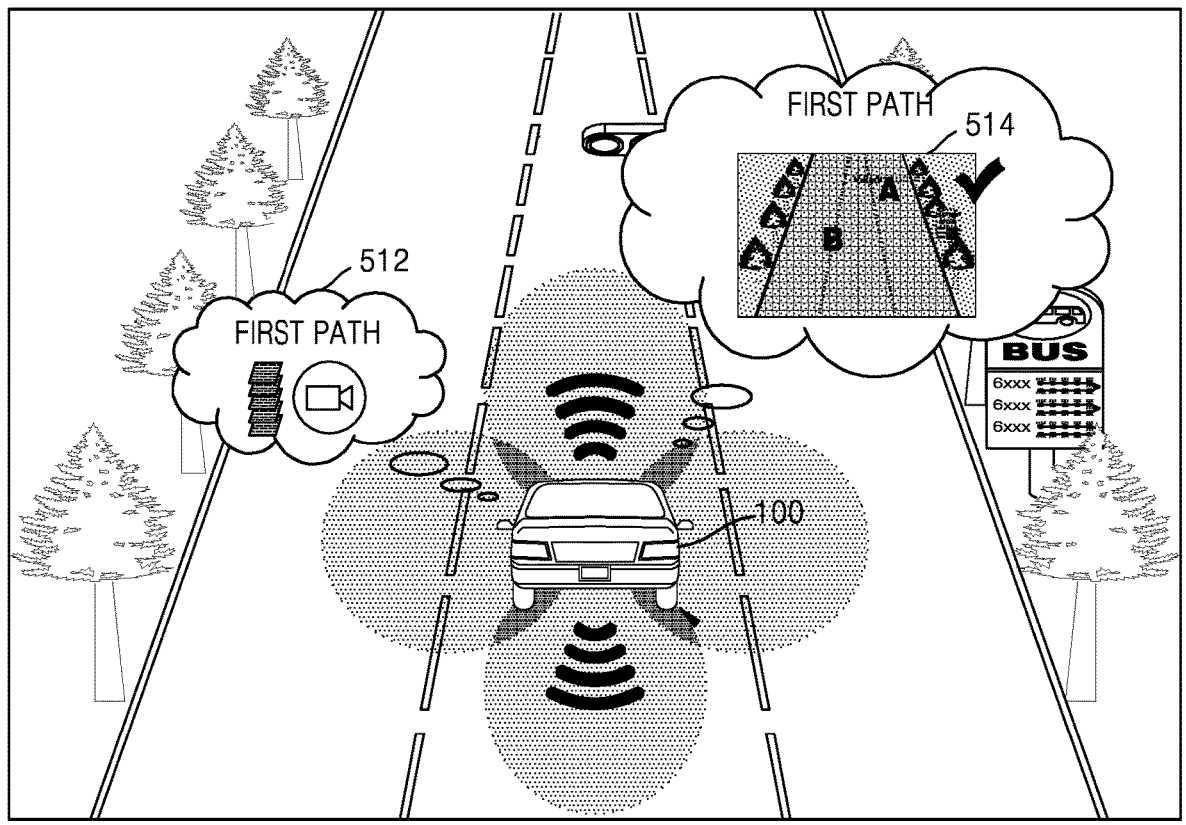
FIG. 5 is a diagram illustrating an example operation, performed by the first vehicle, of determining reliability of obtained detailed map data, according to an embodiment.

FIG. 5 is a diagram illustrating an example operation, performed by the first vehicle 100, of determining reliability of obtained detailed map data, according to an embodiment.

Referring to FIG. 5, the first vehicle 100 according to an embodiment may collect second traveling data 512 about the first path at the second time point different from the first time point when the first traveling data is collected. The first vehicle 100 may compare third traveling data 514 predicted by the first detailed map data with the second traveling data 512, simultaneously with the collecting of the second traveling data 512. The first vehicle 100 may determine the reliability of the first detailed map data, based on similarity between the third traveling data 514 predicted by the first detailed map data and the second traveling data 512.

For example, when the point A on the first path should be under construction according to the third traveling data 514 but the construction on the point A has been completed according to the second traveling data, the reliability of the first detailed map data may be downward regulated.

As another example, referring to the third traveling data 514, when there should exist a stopped line on a point B on the first path but a stopped line is at a location exceeding an allowable error range (e.g., 20 cm) from the point B, the reliability of the first detailed map data may be downward regulated.

According to an embodiment, the first vehicle 100 may allocate a high reliability to a recent version of traveling data. For example, the first vehicle 100 may allocate a higher reliability to a second version of traveling data collected on Oct. 15, 2017 than to a first version of traveling data collected on Oct. 1, 2017. Accordingly, the first vehicle 100 may update the first detailed map data, based on the recent version of traveling data. The operation of updating the first detailed map data will now be described in greater detail with reference to FIG. 6.

Figure 6:
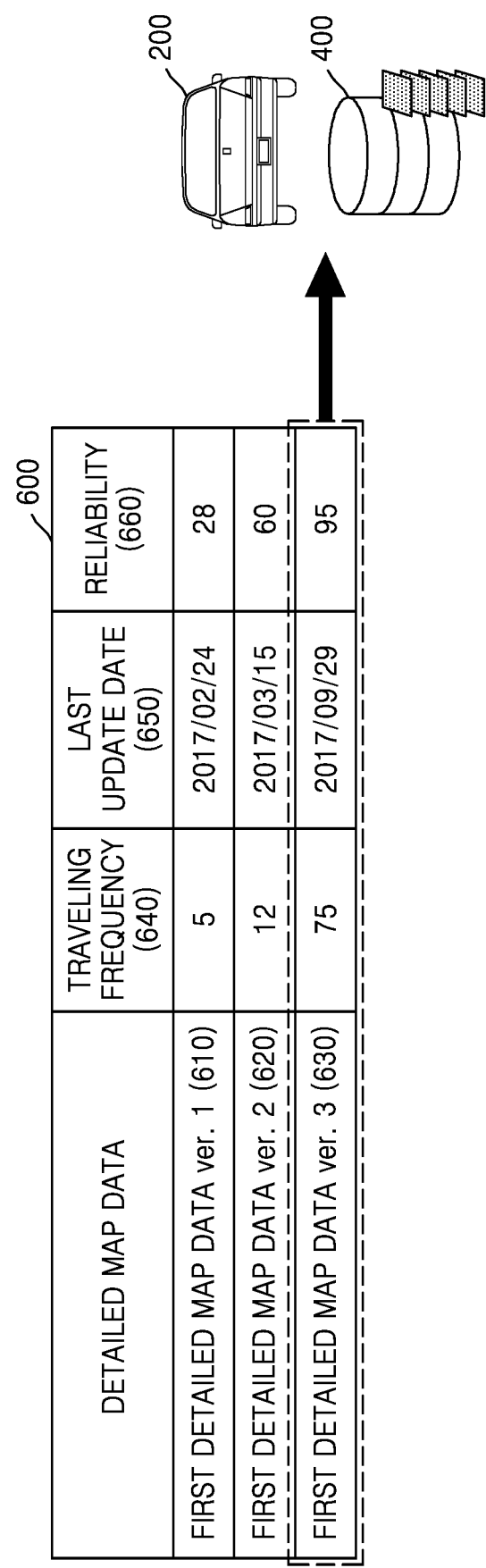
FIG. 6 is a diagram illustrating an example operation, performed by the first vehicle, of providing obtained detailed map data to an external device, according to an embodiment.

FIG. 6 is a diagram illustrating an example operation, performed by the first vehicle 100, of providing obtained detailed map data to an external device 200 or 400, according to an embodiment.

FIG. 6 illustrates an example of generation history information 600 about first through third versions 610, 620, and 630 of the first detailed map data obtained by the first vehicle 100. The generation history information 600 may include items such as a traveling frequency 640, a last update date 650, and a reliability 660. However, disclosed embodiments are not limited thereto, and the generation history information 600 may include more or less items than the illustrated items.

As the first vehicle 100 repeatedly travels the first path, the first vehicle 100 may repeatedly collect the first traveling data about the first path. The first vehicle 100 may update the first detailed map data, based on the repeatedly collected first traveling data.

As shown in FIG. 6, the first version 610 of the first detailed map data is obtained based on first traveling data collected by the first vehicle 100 traveling the first path five times, and may be updated last on Feb. 24, 2017. The second version 620 of the first detailed map data is obtained based on first traveling data collected by the first vehicle 100 traveling the first path twelve times, and may be updated last on Mar. 15, 2017. The third version 630 of the first detailed map data is obtained based on first traveling data collected by the first vehicle 100 traveling the first path seventy five times, and may be updated last on Sep. 29, 2017. The first, second, and third versions 610, 620, and 630 of the first detailed map data may represent consecutively-updated pieces of first detailed map data.

According to an embodiment, the first vehicle 100 may update pre-obtained first detailed map data every time new first traveling data about the first path is collected.

According to another embodiment, the first vehicle 100 may update the pre-obtained first traveling data at certain intervals. For example, the first vehicle 100 may update pre-obtained first detailed map data, based on additionally collected first traveling data, at intervals of a certain date.

According to another embodiment, the first vehicle 100 may update the pre-obtained first detailed map data, based on the additionally collected first traveling data, every time the number of times the first path is traveled increases by a certain number of times.

The first vehicle 100 may provide the external device 200 or 400 with detailed map data indicating that at least one of the traveling frequency 640 and the reliability 660 is equal to or greater than a predetermined threshold value, from among the first, second, and third versions 610, 620, and 630 of the obtained first detailed map data.

For example, a threshold value for the traveling frequency 640 may be 50, and a threshold value for the reliability 660 may be 80. In this example, the first vehicle 100 may determine the third version 630 of the first detailed map data as the detailed map data indicating that at least one of the traveling frequency 640 and the reliability 660 is equal to or greater than the threshold value, from among the first, second, and third versions 610, 620, and 630 of the obtained first detailed map data. The first vehicle 100 may provide the determined third version 630 of the first detailed map data to the external device 200 or 400.

Figure 7:
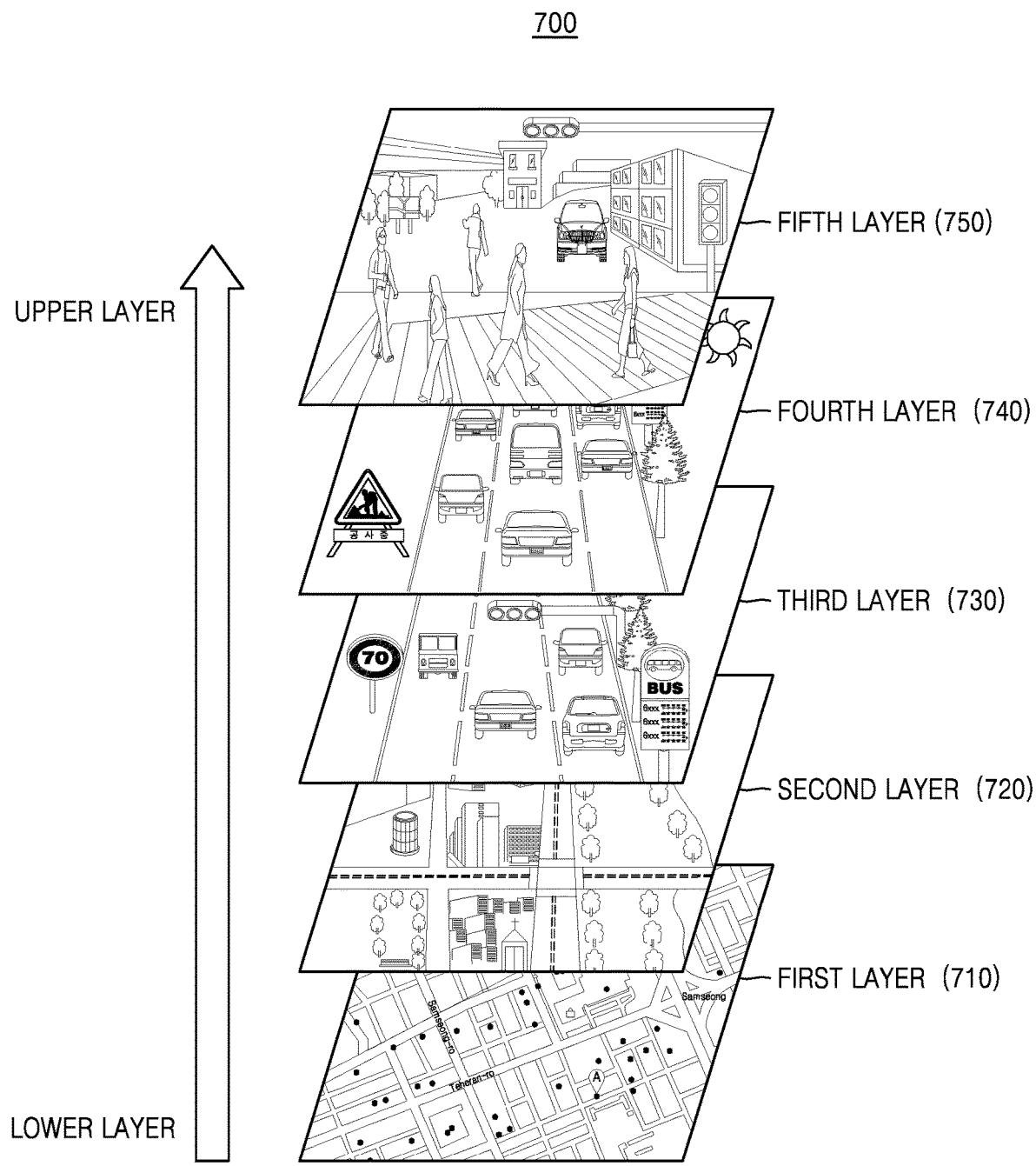
FIG. 7 is a diagram illustrating an example structure of first detailed map data obtained by the first vehicle, according to an embodiment.

FIG. 7 is a diagram illustrating an example structure of first detailed map data 700 obtained by the first vehicle 100, according to an embodiment.

FIG. 7 illustrates an example of the structure of the first detailed map data 700 obtained by the first vehicle 100.

Detailed map data for autonomous traveling may not only inform a user of a path to a destination but also may provide information necessary for generating the path to the destination, continuously ascertain a current location of a vehicle such that the vehicle moves to the generated path, and determining a speed and a direction of the vehicle.

Accordingly, the first vehicle 100 may generate the first detailed map data 700 by classifying information relatively insensitive to a time variation and information to be updated in units of hours, minutes, or seconds by layers such that an autonomous vehicle may accurately determine a current location.

According to an embodiment, the first vehicle 100 may generate the first detailed map data 700 by arranging data insensitive to a time variation on a lower layer and data sensitive to the time variation on an upper layer.

For example, the first vehicle 100 may generate the first detailed map data 700 such that map data about the first path is included in a first layer 710. The first vehicle 100 may generate the first detailed map data 700 such that data about lanes of a road included in the first path is included in a second layer 720. The first vehicle 100 may generate the first detailed map data 700 such that data about a location and a structure of traffic lights and traffic signs on the road included in the first path is included in a third layer 730. The first vehicle 100 may generate the first detailed map data 700 such that data about the weather of the first path, traffic jam, or data about road constructions during collection of the first traveling data is included in a fourth layer 740. The first vehicle 100 may generate the first detailed map data 700 such that data about a sign of the traffic lights of the first path and movements of pedestrians during collection of the first traveling data is included in a fifth layer 750.

According to an embodiment, the first vehicle 100 may determine the reliability of the first detailed map data in consideration of attributes according to time sensitivity of the data included in the first detailed map data. For example, the first vehicle 100 may determine the reliability of each of the first through fifth layers 710, 720, 730, 740, and 750 included in the first detailed map data, or may determine the reliability of the first detailed map data by applying different weights to the first through fifth layers 710, 720, 730, 740, and 750 included in the first detailed map data, respectively.

According to an embodiment, the first vehicle 100 may perform updating based on the second traveling data obtained at the second time point different from the first time point when the first traveling data was obtained, with respect to each of the first through fifth layers 710, 720, 730, 740, and 750 included in the first detailed map data, in consideration of the attributes according to time sensitivity of data included in the first detailed map data. For example, the first vehicle 100 may determine an updating cycle for an upper layer having relatively high time sensitivity to be shorter than that for a lower layer having relatively low time sensitivity.

According to an embodiment, the first vehicle 100 may provide an external device with only some of the layers included in the first detailed map data 700, according to a communication environment. For example, when a communication environment is not good or an allocated bandwidth is narrow, it may be difficult for the first vehicle 100 to provide the entire first detailed map data 700 to an external device. In this example, the first vehicle 100 may provide the external device with only the first through third layers 710, 720 and 730 including structural information about the first path.

Figure 8:
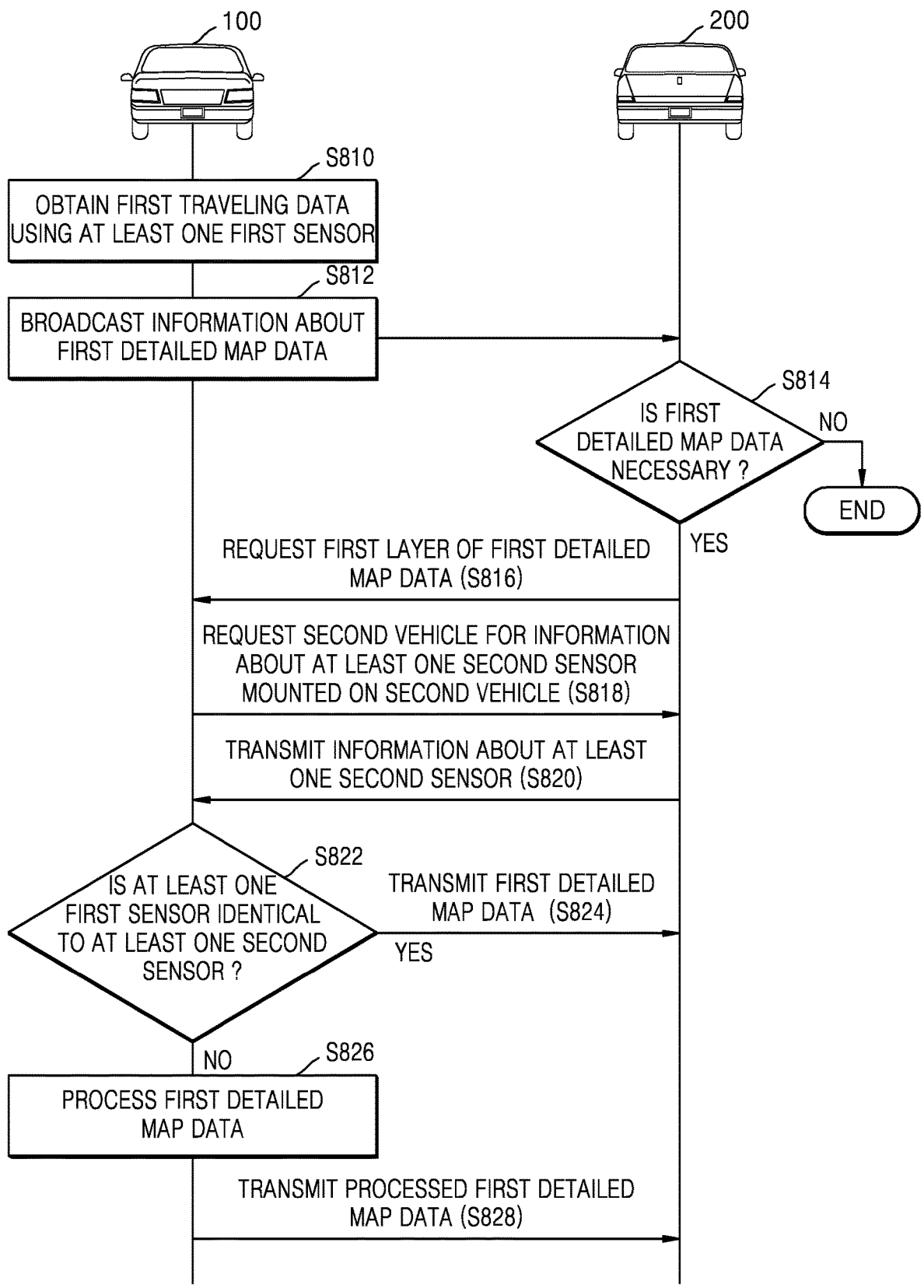
FIG. 8 is a flowchart illustrating an example method, performed by the first vehicle, of providing detailed map data to a second vehicle, based on Vehicle to Vehicle (V2V) communication, according to an embodiment.

FIG. 8 is a flowchart illustrating an example method, performed by the first vehicle 100, of providing detailed map data to the second vehicle 200, based, for example, on V2V communication, according to an embodiment.

Referring to FIG. 8, in operation S810, the first vehicle 100 may obtain the first traveling data about the first path using the at least one first sensor.

The first vehicle 100 may collect the first traveling data using the at least one first sensor while traveling the first path. The first vehicle 100 may generate the first detailed map data about the first path, based on the first traveling data. Operation S810 of FIG. 8 may correspond, for example, to operations S210 and S220 described above with reference to FIG. 2.

In operation S812, the first vehicle 100 may broadcast information about the first detailed map data.

According to an embodiment, the information about the first detailed map data may include information necessary for determining whether the second vehicle 200 which is to receive the first detailed map data needs the first detailed map data.

For example, the information about the first detailed map data may include information about which path the first detailed map data is about, information of a sensor used to generate the first detailed map data (for example, the type of a sensor, the number of sensors, and the specification of the sensor), and information about the reliability of the first detailed map data. The information about the first detailed map data may also include generation history information about the first detailed map data.

In operation S814, the second vehicle 200 may determine whether the first detailed map data is necessary, based on the information about the first detailed map data broadcast by the first layer 100.

According to an embodiment, the second vehicle 200 may determine whether the first detailed map data is needed by the second vehicle 200, based on, for example, whether the first path is needed by the second vehicle 200, whether the first detailed map data is usable by the second vehicle 200, and whether reliability of the first detailed map data is sufficiently high.

In operation S816, when it is determined that the second vehicle 200 needs the first detailed map data, the second vehicle 200 may request the first layer of the first detailed map data. The second vehicle 200 may transmit a message requesting the first detailed map data to the first vehicle 100, based on V2V communication.

In operation S818, the first vehicle 100 may request the second vehicle 200 for information about at least one second sensor mounted on the second vehicle 200.

The information about the at least one second sensor may include information about the type of at least one second sensor mounted on the second vehicle 200, the number of second sensors for each type, a location on which each second sensor is mounted, and the specification of each second sensor.

In operation S820, the second vehicle 200 may transmit the information about the at least one second sensor to the first vehicle 100.

According to an embodiment, the second vehicle 200 may transmit the information about the at least one second sensor to the first vehicle 100, based on V2V communication.

In operation S822, the first vehicle 100 may determine whether the at least one first sensor used to obtain the first detailed map data is identical to the at least one second sensor, based on the information about the at least one second sensor.

According to an embodiment, the at least one first sensor being identical with the at least one second sensor may refer to the at least one first sensor and the at least one second sensor being the same as each other in terms of type and specification.

When it is determined in operation S822 that the at least one first sensor is identical with the at least one second sensor, the first vehicle 100 may transmit the first detailed map data to the second layer 200, in operation S824.

When it is determined in operation S822 that the at least one first sensor is not identical with the at least one second sensor, the first vehicle 100 may process the first detailed map data such that the first detailed map data is compatible with the second layer 200, in operation S826.

According to an embodiment, the first vehicle 100 may determine, based on the information about the at least one second sensor, that the number of types of at least one first sensor mounted on the first vehicle 100 is greater than that of types of at least one second sensor mounted on the second vehicle 200. In this example, the first vehicle 100 may perform processing of removing data unusable by the at least one second sensor mounted on the second vehicle 200, from among the data included in the first detailed map data.

The first vehicle 100 may perform processing of converting the data unusable by the at least one second sensor mounted on the second vehicle 200, from among the data included in the first detailed map data, into a type of data usable by a sensor included in the at least one second sensor.

According to an embodiment, the first vehicle 100 may determine, based on the information about the at least one second sensor, that the number of types of at least one first sensor mounted on the first vehicle 100 is less than that of types of at least one second sensor mounted on the second vehicle 200. In this example, the first vehicle 100 may process the first detailed map data such that the first detailed map data may be used by additionally utilizing types of sensors further included in the at least one second sensor.

According to the aforementioned embodiments, a method of processing the first detailed map data, based on the types of sensors included in the at least one first sensor and the at least one second sensor, has been described. However, disclosed embodiments are not limited thereto. According to an embodiment, the first vehicle 100 may process the first detailed map data such that the first detailed map data is highly compatible in the second vehicle 200, in consideration of at least one of the number of sensors for each type included in the at least one first sensor and the at least one second sensor, a location on a vehicle where each sensor is mounted, and the specification of each sensor.

In operation S828, the first vehicle 100 may transmit the processed first detailed map data to the second vehicle 200.

The operations S812 through S828 described above with reference to FIG. 8 may be included in operation S230 described above with reference to FIG. 2. The operations S812 through S828 described above with reference to FIG. 8 may be included in operation S450 described above with reference to FIG. 4.

In some cases, operations S822 through S828 described above with reference to FIG. 8 may be omitted. In this example, the first vehicle 100 may transmit the first detailed map data to the second vehicle 200 without the operation of processing the first detailed map data.

Figure 9:
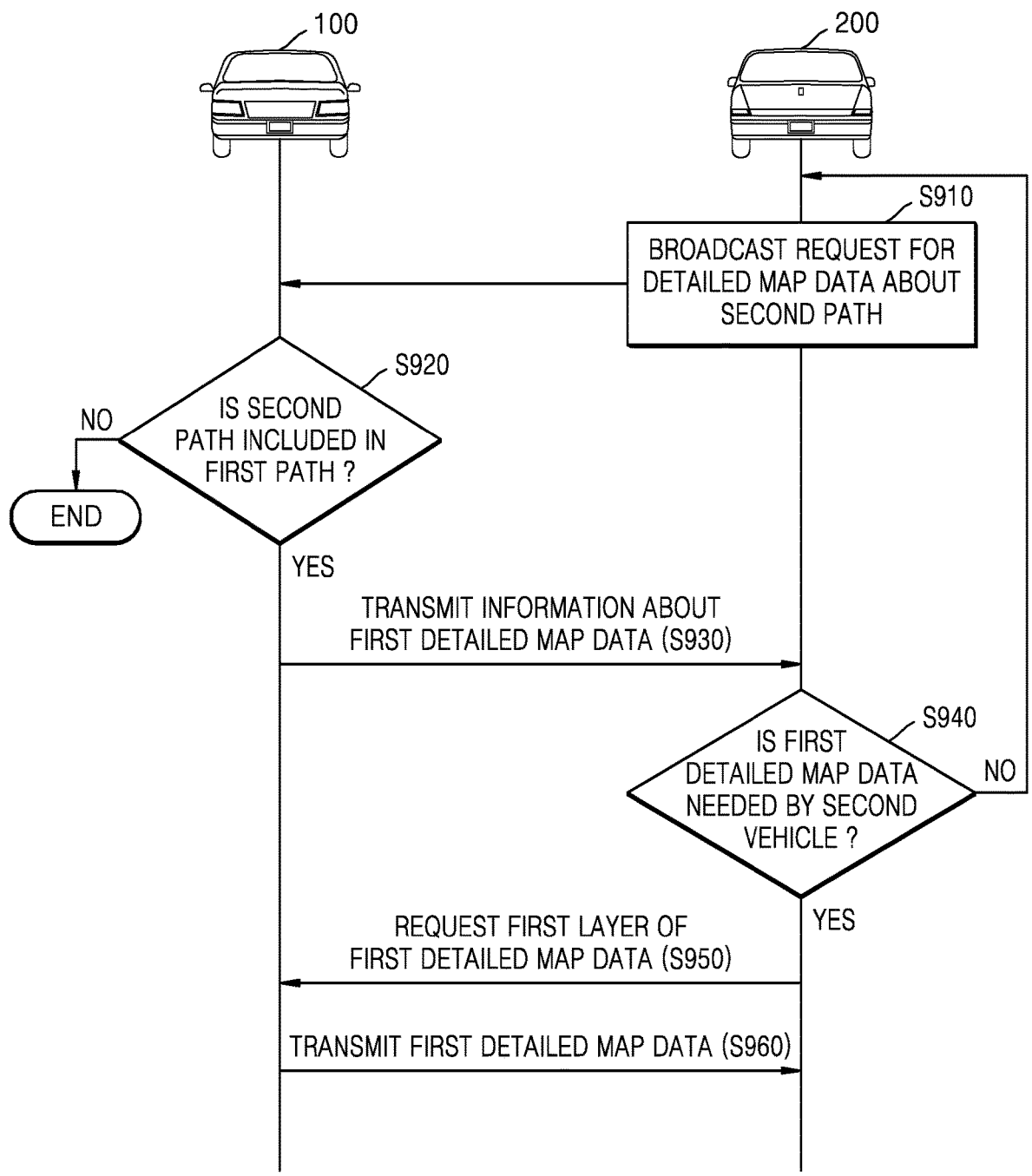
FIG. 9 is a flowchart illustrating an example method, performed by the first vehicle, of providing detailed map data to the second vehicle, based on V2V communication, according to another embodiment.

FIG. 9 is a flowchart illustrating an example method, performed by the first vehicle 100, of providing detailed map data to the second vehicle 200, based on V2V communication, according to another embodiment.

Referring to FIG. 9, in operation S910, the second vehicle 200 may broadcast a request for detailed map data about a second path.

According to an embodiment, the second vehicle 200 may broadcast or advertise a message informing that the second vehicle 200 needs the detailed map data about the second path. At least one vehicle existing within a certain distance from the second vehicle 200 may receive the message broadcast or advertised by the second vehicle 200. FIG. 9 is described on the premise that the first vehicle 100 may receive a request broadcast by the second vehicle 200.

In operation S920, the first vehicle 100 may determine whether the second path is included in the first path. The first vehicle 100 determining whether the second path is included in the first path may include the first vehicle 100 determining whether the second path and the first path are the same paths.

When it is determined in operation S920 that the second path is included in the first path, the first vehicle 100 may transmit information about the first detailed map data to the second vehicle 200, in operation S930.

According to an embodiment, the information about the first detailed map data may include information necessary for determining whether the second vehicle 200 that is to receive the first detailed map data needs the first detailed map data.

For example, the information about the first detailed map data may include generation history information about the first detailed map data. The information about the first detailed map data may include information about which path the first detailed map data is about, information of a sensor used to generate the first detailed map data (for example, the type of a sensor, the number of sensors, and the specification of the sensor), and information about the reliability of the first detailed map data.

In operation S940, the second vehicle 200 may determine whether the first detailed map data is needed by the second vehicle 200, based on the information about the first detailed map data.

According to an embodiment, the second vehicle 200 may determine whether the first detailed map data is needed by the second vehicle 200, based on the information about the first detailed map data received from the first vehicle 100 and based on, for example, whether the first detailed map data is usable by the second vehicle 200 and whether reliability of the first detailed map data is sufficiently high.

When it is determined in operation S940 that the second vehicle 200 needs the first detailed map data, the second vehicle 200 may request the first layer of the first detailed map data, in operation S950.

In operation S960, the first vehicle 100 may transmit the first detailed map data to the second vehicle 200.

According to an embodiment, as described in operations S820 through S828 of FIG. 8, the first vehicle 100 may process the first detailed map data, based on the information about the at least one second sensor mounted on the second vehicle 200, and transmit a result of the processing to the second vehicle 200. A redundant description thereof will not be repeated here.

According to an embodiment, the first vehicle 100 may process the first detailed map data corresponding to the first path such that the first detailed map data includes only detailed map data corresponding to the second path. The first vehicle 100 may provide the first detailed map data processed to correspond to the second path to the second vehicle 200.

According to the aforementioned embodiments, a method of providing the first detailed map data obtained by the first vehicle 100 to the second vehicle 200, based on V2V communication, has been described. A method of providing the first detailed map data obtained by the first vehicle 100 to a plurality of vehicles via the server 400 by uploading the obtained first detailed map data to the server 400 will now be described.

Figure 10:
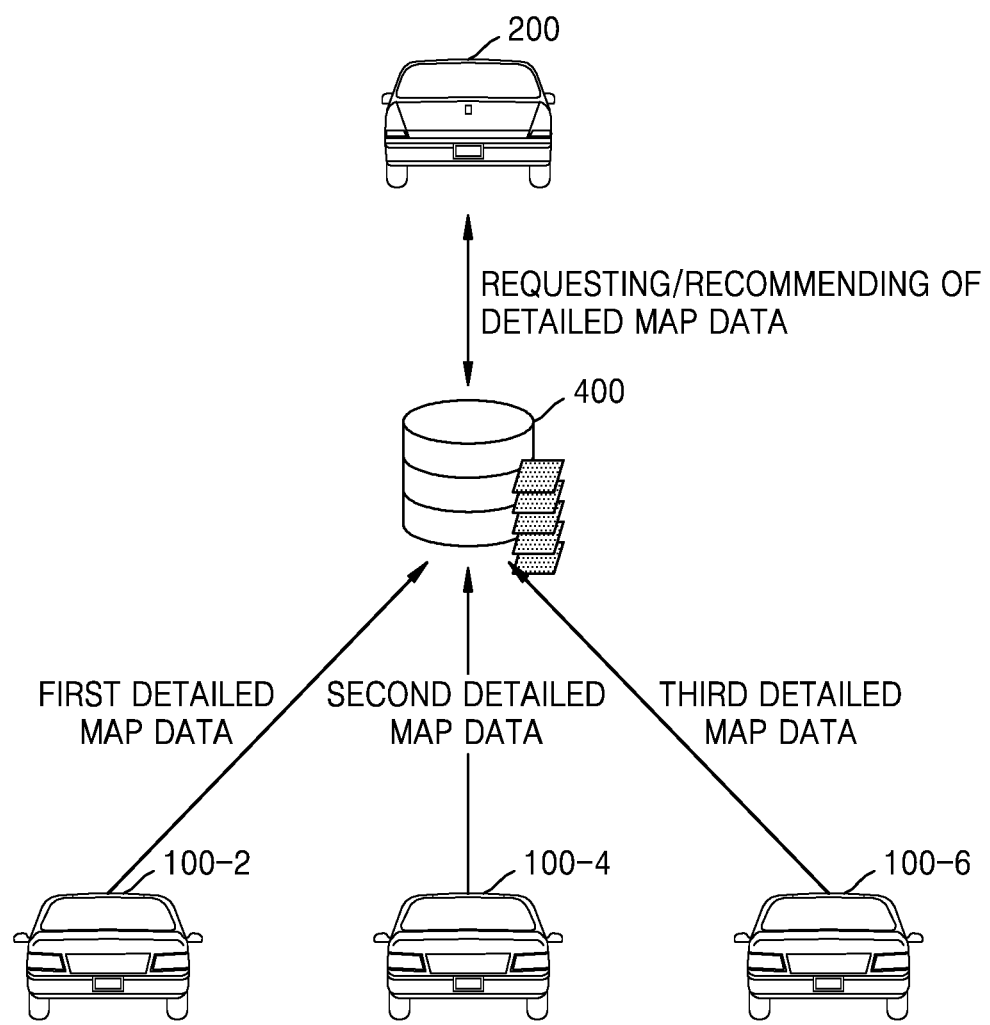
FIG. 10 is a diagram illustrating an example operation, performed by a server, of recommending at least one piece of detailed map data received from at least one first vehicle to the second vehicle, according to an embodiment.

FIG. 10 is a diagram illustrating an example operation, performed by the server 400, of recommending at least one piece of detailed map data received from at least one first vehicle, namely, first vehicles 100-2, 100-4, and 100-6, to the second vehicle 200, according to an embodiment.

The server 400 may receive and manage detailed map data about certain paths generated by a plurality of vehicles. The server 400 may recommend suitable detailed map data to a vehicle that requests detailed map data about a certain path.

Referring to FIG. 10, the server 400 may receive first detailed map data through third detailed map data respectively provided by the first vehicles 100-2, 100-4, and 100-6, based on a certain criterion.

The server 400 may classify the received first detailed map data through the received third detailed map data according to a certain criterion, and may perform a certain managing process. For example, the server 400 may classify the first detailed map data through the third detailed map data according to paths, and may store the classified detailed map data pieces in different categories. The server 400 may determine the ranking of reliability of at least one piece of detailed map data included in each category. The server 400 may arrange the at least one piece of detailed map data included in each category, according to the determined ranking of reliability.

The server 400 may receive a request for detailed map data corresponding to a certain path from the second vehicle 200. The server 400 may recommend at least one piece of detailed map data about the certain path to the second vehicle 200, based on a certain criterion. For example, the server 400 may determine at least one piece of detailed map data that is to be recommended to the second vehicle 200, based on at least one of the reliability ranking of the detailed map data about a certain path, the type of the second vehicle 200, the at least one second sensor mounted on the second vehicle 200, and a traveling environment where detailed map data to be recommended is to be used.

The server 400 may receive an input of selecting one from the recommended at least one piece of detailed map data, from the second vehicle 200. The sever 400 may transmit detailed map data corresponding to the input made by the second vehicle 200 to the second vehicle 200. The server 400 may receive a feedback with respect to detailed map data (e.g., a score or review about the detailed map data) from the second vehicle 200.

A method of sharing detailed map data via the server 400 will now be described in greater detail.

Figure 11:
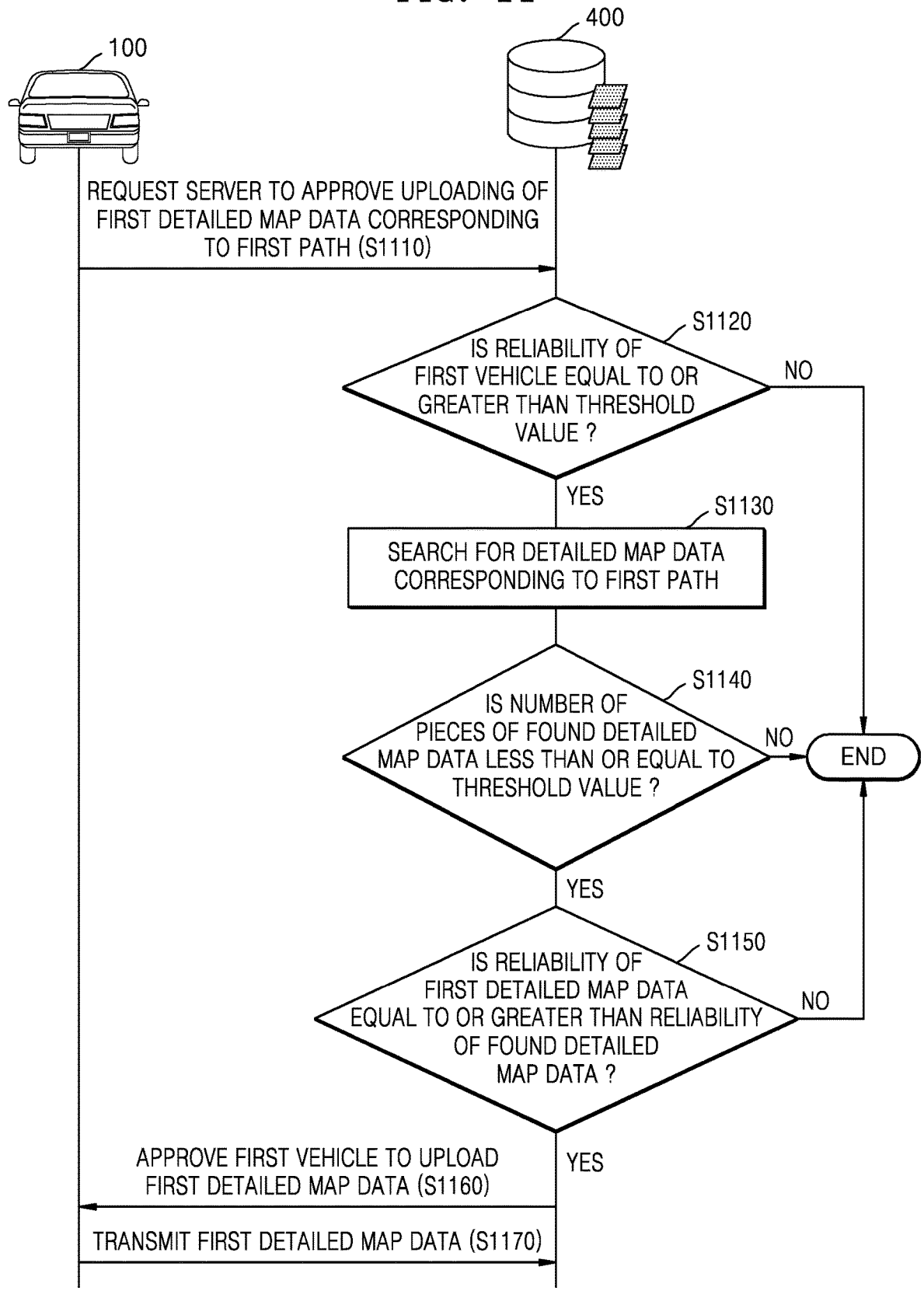
FIG. 11 is a flowchart illustrating an example method, performed by the server, of receiving detailed map data provided by the first vehicle, according to an embodiment.

FIG. 11 is a flowchart illustrating an example method, performed by a server, of receiving detailed map data provided by the first vehicle 100, according to an embodiment.

Referring to FIG. 11, in operation S1110, the first vehicle 100 may request the server 400 to approve uploading of the first detailed map data corresponding to the first path.

According to an embodiment, the first vehicle 100 may request the server 400 to approve uploading of the first detailed map data, via a wireless network.

In operation S1120, the server 400 may determine whether reliability of the first vehicle 100 is equal to or greater than a threshold value.

According to an embodiment, the server 400 may determine the reliability of the first vehicle 100, based on a feedback input by a user who received detailed map data previously uploaded by the first vehicle 100. In the present disclosure, a 'user' of the server 400 may refer, for example, to another vehicle other than the first vehicle 100 or a user of the other vehicle.

For example, when accuracy of the detailed map data previously uploaded by the first vehicle 100 is low or the detailed map data has many errors, users who used the detailed map data uploaded by the first vehicle 100 may provide low scores or negative reviews as feedbacks to the server 400. In this example, the server 400 may determine that the first vehicle 100 has a relatively low reliability, based on the feedbacks of the users. As another example, when the accuracy of the detailed map data previously uploaded by the first vehicle 100 is high or the detailed map data has few errors, the users who used the detailed map data uploaded by the first vehicle 100 may provide high scores or positive reviews as feedbacks to the server 400. In this example, the server 400 may determine that the first vehicle 100 has a relatively high reliability, based on the feedbacks of the users. When there are no detailed map data previously uploaded by the first vehicle 100, the reliability of the first vehicle 100 may not be determined, and thus operation S1120 may be omitted.

According to an embodiment, the server 400 may determine the threshold value with which the reliability of the first vehicle 100 is to be compared. The threshold value may be calculated (determined) by the server 400 according to a certain criterion, or may be determined by a plurality of users of the server 400.

The server 400 may compare the reliability of the first vehicle 100 with the threshold value, and, when the reliability of the first vehicle 100 is less than the threshold value, may refuse the request from the first vehicle 100.

When the reliability of the first vehicle 100 is equal to or greater than the threshold value, the server 400 may search for the detailed map data corresponding to the first path, in operation S1130.

According to an embodiment, the server 400 may search for the detailed map data corresponding to the first path from pieces of detailed map data previously uploaded to the server 400. The server 400 may determine the number of pieces of found detailed map data corresponding to the first path.

In operation S1140, the server 400 may determine whether the number of pieces of found detailed map data corresponding to the first path is less than or equal to a threshold value.

When the server 400 already holds a sufficient amount of detailed map data corresponding to the first path, the server 400 may refuse a request to additionally upload the detailed map data corresponding to the first path. When the number of pieces of found detailed map data corresponding to the first path exceeds the threshold value, the server 400 may refuse the upload request from the first vehicle 100. The threshold value may be calculated (determined) by the server 400 according to a certain criterion, or may be determined by a plurality of users of the server 400.

When the number of pieces of found detailed map data corresponding to the first path is less than or equal to the threshold value, the server 400 may determine whether the reliability of the first detailed map data is equal to or greater than the reliability of the found detailed map data, in operation S1150.

The sever 400 may provide guide information such that the users may determine the reliability of detailed map data generated by the users, according to a uniform criterion. The sever 400 may provide the users with a program including instructions for calculating the reliability of detailed map data or an application for calculating the reliability of detailed map data.

The server 400 may compare reliability of at least one piece of detailed map data from among the pieces of found detailed map data with the reliability of the first detailed map data. For example, the server 400 may compare reliability of detailed map data having lowest reliability from among the pieces of found detailed map data with the reliability of the first detailed map data. As another example, the server 400 may compare an average value of the reliabilities of the pieces of found detailed map data with the reliability of the first detailed map data.

When the reliability of the first detailed map data is less than the reliability of at least one piece of detailed map data from among the pieces of found detailed map data, the server 400 may refuse the upload request from the first vehicle 100.

Even when the reliability of the first detailed map data does not satisfy the aforementioned certain criterion, when the specification of sensors used to generate the first detailed map data is better than that of sensors used to generate previously-held pieces of detailed map data, the server 400 may not refuse the upload request from the first vehicle 100.

When the reliability of the first detailed map data is equal to or greater than the reliability of at least one detailed map data from among the pieces of found detailed map data, the server 400 may approve the first vehicle 100 to upload the first detailed map data, in operation S1160.

In operation S1170, the first vehicle 100 may transmit the first detailed map data to the server 400.

According to an embodiment, the server 400 may store the received first detailed map data in a memory. The server 400 may classify the first detailed map data by categories.

Figure 12:
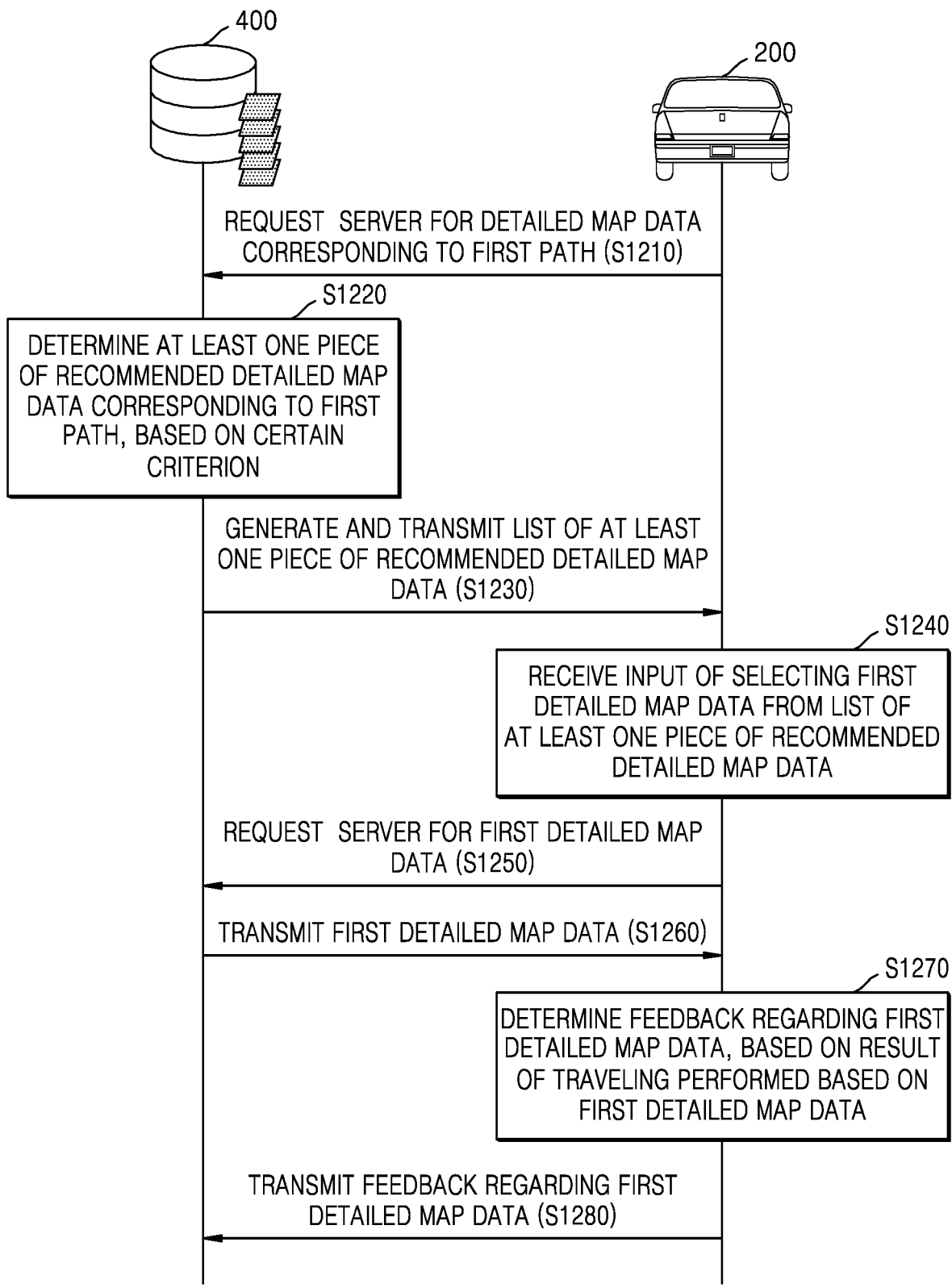
FIG. 12 is a flowchart illustrating an example method, performed by the server, of recommending detailed map data to the second vehicle, according to an embodiment.

FIG. 12 is a flowchart illustrating an example method, performed by the server 400, of recommending detailed map data to the second vehicle 200, according to an embodiment.

Referring to FIG. 12, in operation S1210, the second vehicle 200 may request the server 400 for detailed map data corresponding to the first path.

In operation S1220, the server 400 may determine at least one piece of recommended detailed map data corresponding to the first path, based on a certain criterion.

According to an embodiment, the server 400 may search for detailed map data corresponding to the first path from at least one piece of detailed map data uploaded to the server 400. The server 400 may determine at least one piece of recommended detailed map data from among the pieces of found detailed map data according to a certain criterion.

For example, the server 400 may determine at least one piece of recommended detailed map data from among the pieces of found detailed map data, based on the type of the second vehicle 200. As another example, the server 400 may determine at least one piece of recommended detailed map data from among the pieces of found detailed map data, based on the at least one second sensor mounted on the second vehicle 200. As another example, the server 400 may determine at least one piece of recommended detailed map data from among the pieces of found detailed map data, based on a traveling environment where the second vehicle 200 is to use detailed map data. This will be described in greater detail below with reference to FIGS. 13 through 15.

In operation S1230, the server 400 may generate a list of at least one piece of recommended detailed map data and transmit the generated list to the second vehicle 200.

According to an embodiment, the server 400 may determine the recommendation ranking of the at least one piece of recommended detailed map data, based on a degree to which the determined at least one piece of detailed map data confirms to a certain criterion. The server 400 may arrange the at least one piece of recommended detailed map data on the list, according to the determined recommendation ranking. For example, the server 400 may arrange detailed map data with a recommendation ranking 1 on the top of the list and may arrange detailed map data with a lowest ranking on the bottom thereof. According to another embodiment, the server 400 may distinguish the detailed map data with the recommendation ranking 1 from the other pieces of detailed map data on the list and display them, based on the determined recommendation ranking. For example, the server 400 may highlight or shade the detailed map data with the recommendation ranking 1 on the list.

According to an embodiment, the server 400 may allow detailed information about each recommended detailed map data to be included in the list. For example, the server 400 may generate a list including detailed information, such as reliability of a vehicle having provided each recommended detailed map data, the type of a vehicle used to generate each recommended detailed map data, the type and specification of a sensor used to generate each recommended detailed map data, a traveling environment during generation of each recommended detailed map data, scores provided by other users who used each recommended detailed map data, and the number of times each recommended detailed map data was provided to the other users.

The second vehicle 200 may display the received list of at least one piece of recommended detailed map data. The second vehicle 200 may control a display included therein to display the list. The second vehicle 200 may control an external device connected to the second vehicle 200 via a wireless network and including a display, to display the list.

In operation S1240, the server 200 may receive an input of selecting the first detailed map data from the list of at least one piece of recommended detailed map data.

According to an embodiment, the second vehicle 200 may receive a user input of selecting the first detailed map data from the list of at least one piece of recommended detailed map data, using an input interface.

According to another embodiment, the second vehicle 200 may receive an input of selecting the first detailed map data from the list of at least one piece of recommended detailed map data, from the external device connected to the second vehicle 200 via a wireless network.

In operation S1250, the second vehicle 200 may request the server 400 for the first detailed map data.

According to an embodiment, the second vehicle 200 may request the server 400 for the first detailed map data via a wireless network. For example, when a user of the second vehicle 200 selects the first detailed map data from the list displayed on the display included in the second vehicle 200 and selects a 'request' button, the server 400 may be requested to provide the first detailed map data. As another example, when the user of the second vehicle 200 selects the first detailed map data from the list displayed on the external device connected to the second vehicle 200 via a wireless network and selects a 'request' button, the server 400 may be requested to provide the first detailed map data. In operation S1260, the server 400 may transmit the first detailed map data to the second vehicle 200.

According to an embodiment, the server 400 may transmit the first detailed map data to the second vehicle 200 via a wireless network. For example, the server 400 may transmit the first detailed map data about the first path to the second vehicle 200 at one time. As another example, the server 400 may split the first detailed map data about the first path in units of certain sizes and transmit the split first detailed map data. For example, the server 400 may continuously track a location on the first path where the second vehicle 200 travels. The server 400 may split and transmit the first detailed map data such that the second vehicle 200 may receive in advance detailed map data corresponding to a path that is a certain distance (e.g., 1 km) ahead from a location where the second vehicle 200 is currently traveling.

In operation S1270, the second vehicle 200 may determine a feedback regarding the first detailed map data, based on a result of traveling performed based on the first detailed map data.

According to an embodiment, the second vehicle 200 may determine the feedback regarding the first detailed map data by calculating reliability of the first detailed map data after performing autonomous traveling using the first detailed map data. For example, the second vehicle 200 may calculate the reliability of the first detailed map data, based on similarity between traveling data predicted by the first detailed map data and traveling data collected by the at least one second sensor mounted on the second vehicle 200.

According to another embodiment, the second vehicle 200 may determine the feedback by receiving an evaluation of the first detailed map data from the user of the second vehicle 200. For example, the second vehicle 200 may receive at least one of an evaluation score and a review of the first detailed map data from the user of the second vehicle 200 via an input interface.

In operation S1280, the second vehicle 200 may transmit the feedback regarding the first detailed map data to the server 400.

According to an embodiment, the server 400 may update detailed information about the first detailed map data, based on the feedback received from the second vehicle 200. For example, the server 400 may update a user score about the first detailed map data, based on the feedback received from the second vehicle 200. The server 400 may update the reliability of the vehicle having provided the first detailed map data, based on the feedback received from the second vehicle 200.

According to an embodiment, the server 400 may provide the feedback received from the second vehicle 200 to the vehicle having provided the first detailed map data.

According to an embodiment, the server 400 may update the number of times the first detailed map data was provided to other users, after transmitting the first detailed map data to the second vehicle 200. The server 400 may determine whether the number of times the first detailed map data was provided to the other users exceeds a certain number of times. When the number of times the first detailed map data was provided to the other users exceeds the certain number of times, the server 400 may pay a certain price to the vehicle having provided the first detailed map data.

For example, the server 400 may pay a certain usage fee to the vehicle having provided the first detailed map data, according to the terms and conditions shared with the users of the server 400. As another example, the server 400 may establish certain currency that may be used in the server 400, and pay a certain amount of money based on the established currency to the vehicle having provided the first detailed map data. In the aforementioned example, only when the number of times the first detailed map data was provided to the other users exceeds the certain number of times, the server 400 pays a certain price to the vehicle having provided the first detailed map data. However, disclosed embodiments are not limited thereto. Whenever the first detailed map data is provided to the other users, the server 400 may pay a certain price to the vehicle having provided the first detailed map data. The server 400 may pay a certain price to vehicles that uploaded detailed map data to the server 400, at certain intervals.

Figure 13:
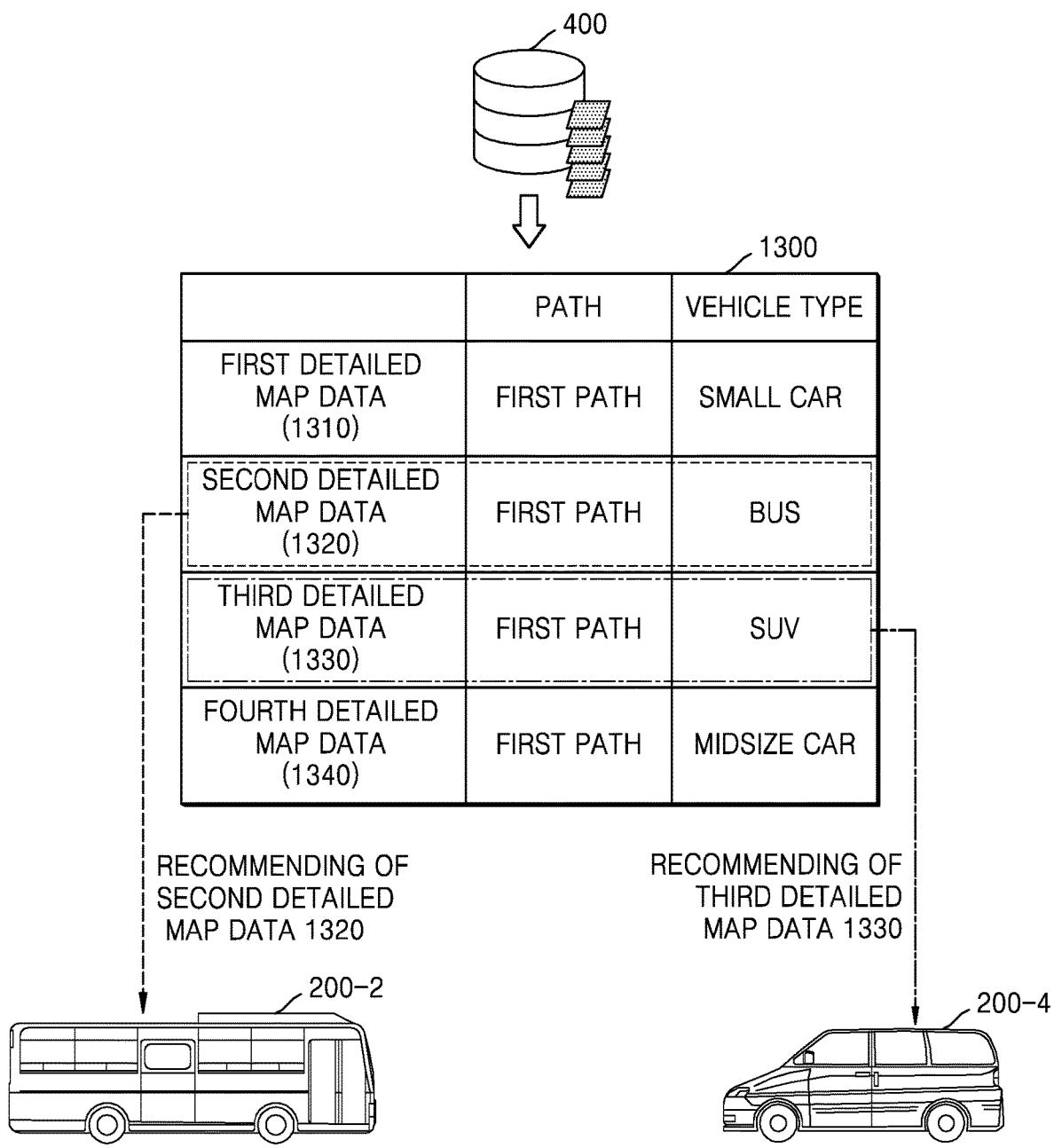
FIG. 13 is a diagram illustrating an example operation, performed by the server, of recommending detailed map data, based on the type of the second vehicle, according to an embodiment.

FIG. 13 is a diagram illustrating an example operation, performed by the server 400, of recommending detailed map data, based on the type of the second vehicle 200, according to an embodiment.

According to types of a vehicle, an item to be considered during autonomous traveling and the range of a space to be sensed for safe autonomous traveling may vary. In relation to this, for example, a 'bus' occupies a large space on a road when making a curve, because the size of the bus is big. Accordingly, the range of a space to be sensed by a 'bus' to safely perform an operation such as a right turn or a left turn is greater than that of a space to be sensed by a small vehicle.

As such, according to types of a vehicle, the range of a space to be sensed for autonomous traveling and sensor data necessary for an operation of the vehicle may vary. Thus, the server 400 according to an embodiment may determine, as recommended detailed map data, the detailed map data provided by a vehicle having the same type as a vehicle that requests the detailed map data, in order to recommend more suitable detailed map data to the vehicle that requests the detailed map data.

FIG. 13 illustrates an example of a method, performed by the server 400, of determining recommended detailed map data corresponding to the first path, based on the types of second vehicles 200-2 and 200-4.

As the second vehicles 200-2 and 200-4 request the detailed map data corresponding to the first path, the server 400 may search for the detailed map data corresponding to the first path from among the pieces of detailed map data uploaded to the server 400. The server 400 may determine at least one piece of recommended detailed map data according to the types of the second vehicles 200-2 and 200-4, from among found detailed map data 1300.

For example, when the vehicle type of the second vehicle 200-2 is a 'bus', the server 400 may determine second detailed map data 1320 provided by a vehicle whose type is a 'bus', from among the found detailed map data 1300, as recommended detailed map data. When the vehicle type of the second vehicle 200-4 is a 'SUV', the server 400 may determine third detailed map data 1330 provided by a vehicle whose type is a 'SUV', from among the found detailed map data 1300, as recommended detailed map data. The first detailed map data 1310 for a 'small car' and fourth detailed map data 1340 for a 'midsize car' may be determined not to be recommended based on a difference between the type of car and the second vehicle type.

When found detailed map data includes no detailed map data provided by vehicles having the same types as the types of the second vehicles 200-2 and 200-4, the server 400 may determine at least one piece of detailed map data provided by vehicles having similar types to those of the second vehicles 200-2 and 200-4, as recommended detailed map data.

Figure 14:
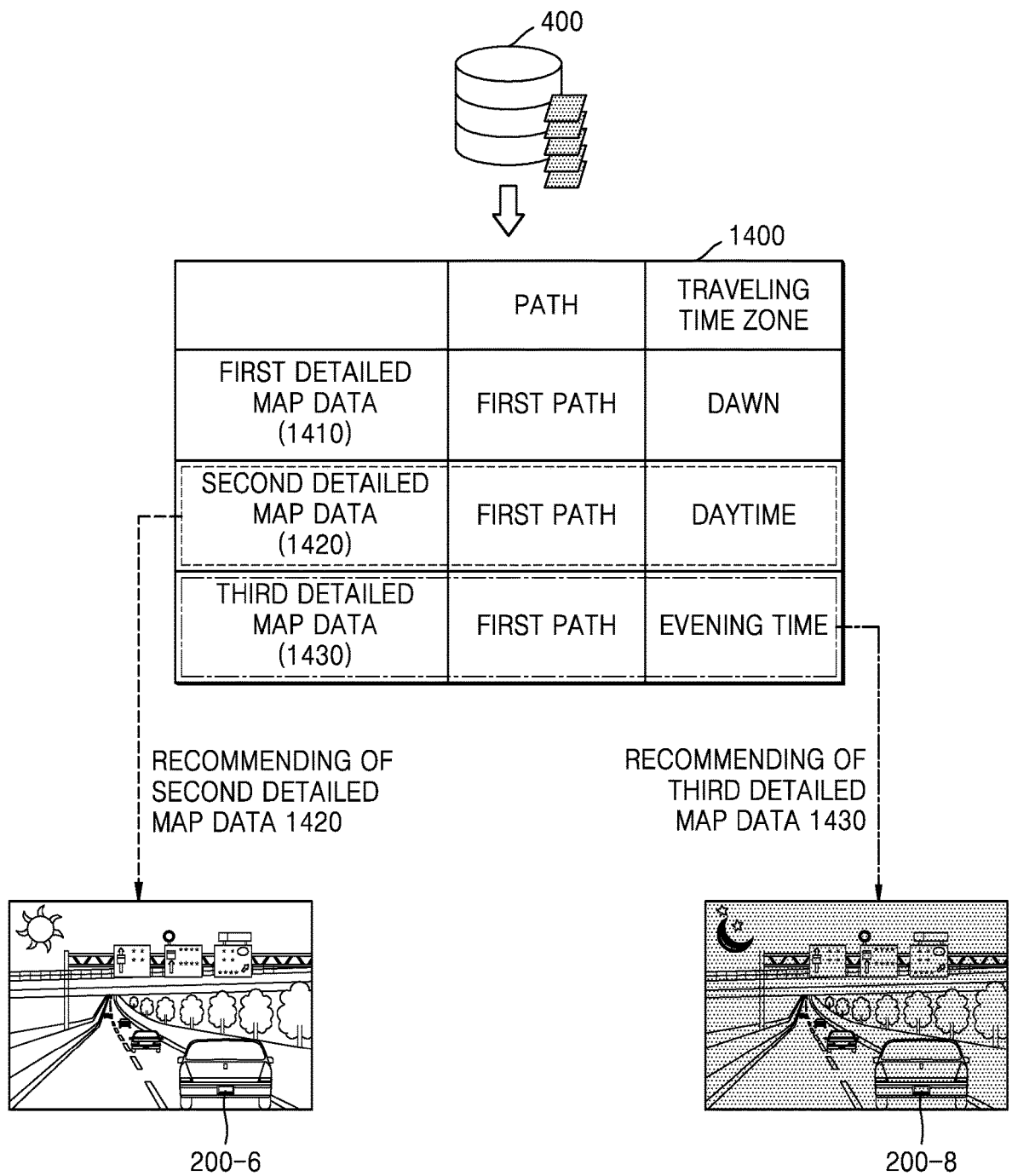
FIG. 14 is a diagram illustrating an example operation, performed by the server, of recommending detailed map data, based on a traveling time zone of the second vehicle, according to an embodiment.

FIG. 14 is a diagram illustrating an example operation, performed by the server 400, of recommending detailed map data, based on a traveling time zone of the second vehicle 200, according to an embodiment.

According to traveling time zones, different items may need to be considered during road traveling. For example, in the case of road traveling at a late night or dawn time zone, because the number of vehicles currently traveling on a road is very small, traffic speeds of the vehicles may be very high. Moreover, because it is dark in surroundings of the road, traveling data needs to be obtained based on a sensor independent from light instead of a sensor that obtains detection data depending on the light of the surroundings. In the case of road traveling at a morning time zone, because the number of vehicles currently traveling on a road is relatively large, an interval between vehicles may be narrow. In addition, because it is bright in surroundings of the road, traveling data may be obtained based on a sensor that is dependent upon light.

As such, because a road traveling environment varies according to a traveling time zone, different items need to be considered during autonomous traveling, and accordingly, different pieces of detection data may be necessary.

The server 400 according to an embodiment may determine recommended detailed map data, based on time zones when second vehicles 200-6 and 200-8 request detailed map data, in order to recommend more suitable detailed map data to a vehicle that requests the detailed map data.

FIG. 14 illustrates an example of a method, performed by the server 400, of determining recommended detailed map data corresponding to the first path, based the on time zones when the second vehicles 200-6 and 200-8 request detailed map data.

As the second vehicles 200-6 and 200-8 request the detailed map data corresponding to the first path, the server 400 may search for the detailed map data corresponding to the first path from among detailed map data uploaded to the server 400. The server 400 may determine at least one piece of detailed map data generated based on traveling data collected at time zones corresponding to the time zones when the second vehicles 200-6 and 200-8 requested detailed map data, from among found detailed map data 1400.

For example, when the time zone when the second vehicle 200-6 requested detailed map data is 'daytime', the server 400 may determine second detailed map data 1420 generated based on traveling data collected at a 'daytime', from among the found detailed map data 1400, as recommended detailed map data. On the other hand, when the time zone when the second vehicle 200-8 requested detailed map data is 'evening time', the server 400 may determine third detailed map data 1430 generated based on traveling data collected at an 'evening time', from among the found detailed map data 1400, as recommended detailed map data.

On the other hand, when there is no detailed map data generated based on traveling data collected at time zones corresponding to the time zones when the second vehicles 200-6 and 200-8 requested detailed map data, the server 400 may determine detailed map data generated based on traveling data collected at similar time zones to the time zones when the second vehicles 200-6 and 200-8 requested detailed map data, as recommended detailed map data.

For example, when the second vehicle 200-8 requested detailed map data at 'evening time' but the detailed map data 1400 has no detailed map data generated based on traveling data collected at 'evening time' (third detailed map data 1430), the server 400 may determine first detailed map data 1410 generated based on traveling data collected at 'dawn', as recommended detailed map data.

Figure 15:
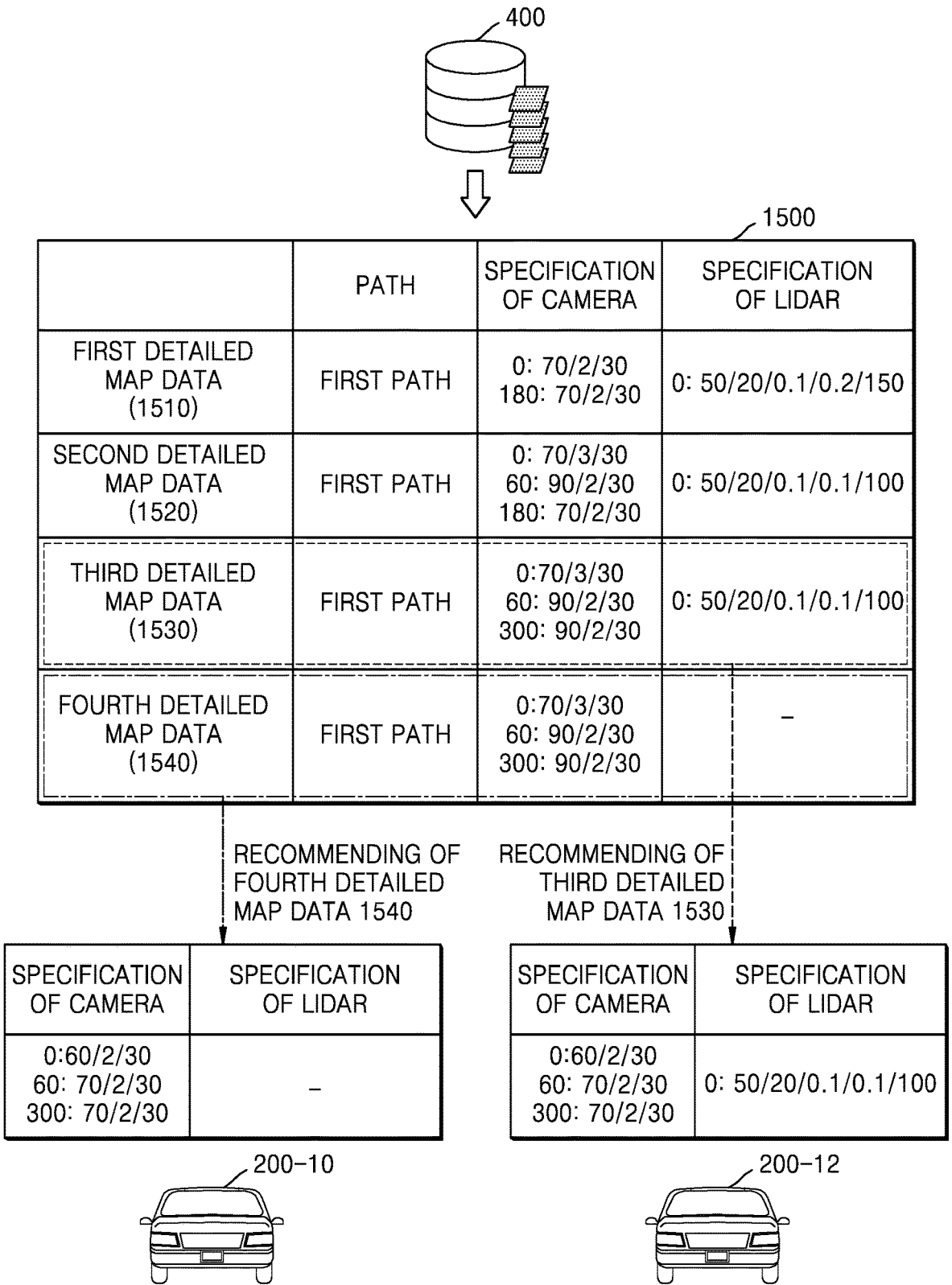
FIG. 15 is a diagram illustrating an example operation, performed by the server, of recommending detailed map data, based on the types and specifications of sensors mounted on the second vehicle, according to an embodiment.

FIG. 15 is a diagram illustrating an example operation, performed by the server 400, of recommending detailed map data, based on the types and specifications of sensors mounted on the second vehicle 200, according to an embodiment.

Because different types of data may be detected according to different types and specifications of sensors mounted on a vehicle, different pieces of detailed map data may be needed for autonomous traveling. Accordingly, the server 400 according to an embodiment may determine recommended detailed map data in consideration of the types and specifications of sensors mounted on a vehicle that requests detailed map data, in order to recommend more suitable detailed map data to the vehicle that requests the detailed map data.

FIG. 15 illustrates an example of a method, performed by the server 400, of determining recommended detailed map data corresponding to the first path, based on the types and specifications of sensors mounted on second vehicles 200-10 and 200-12.

As the second vehicles 200-10 and 200-12 request detailed map data corresponding to the first path, the server 400 may search for the detailed map data corresponding to the first path from among pieces of detailed map data uploaded to the server 400. The server 400 may determine, as recommended detailed map data, at least one piece of detailed map data provided by a vehicle including sensors corresponding to the types and specifications of sensors mounted on the second vehicles 200-10 and 200-12, from among found detailed map data 1500.

For example, the second vehicle 200-10 may be a vehicle including only a camera. The second vehicle 200-10 may be a vehicle including three cameras arranged at angles of 0°, 60°, and 300°, respectively, with respect to the second vehicle 200-10. The camera arranged at 0° with respect to the second vehicle 200-10 may have a horizontal Field of View (FoV) of 60°, a pixel density of 2 megapixels, and a frame rate of 30 (per sec). The camera arranged at 60° with respect to the second vehicle 200-10 may have a horizontal FoV of 70°, a pixel density of 2 (per inch), and a frame rate of 30 (per sec). The camera arranged at 300° with respect to the second vehicle 200-10 may have a horizontal FoV of 70°, a pixel density of 2 megapixels, and a frame rate of 30 (per sec).

The server 400 may determine detailed map data including data usable by the cameras mounted on the second vehicle 200-10, from among the found detailed map data 1500. The server 400 may determine that the specifications of cameras used to generate fourth detailed map data 1540 correspond to the specifications of the cameras mounted on the second vehicle 200-10. The specifications of the cameras corresponding to the specifications of the cameras may mean that the specifications of the cameras mounted on the second vehicle 200-10 are sub-sets of the specifications of the cameras used to generate the fourth detailed map data 1540. The server 400 may determine, as recommended detailed map data, the fourth detailed map data 1540 generated using sensors corresponding to the types and specifications of sensors mounted on the second vehicles 200-10.

As another example, the second vehicle 200-12 may be a vehicle including a camera and a lidar. The second vehicle 200-12 may be a vehicle including cameras the number of which is the same as the number of cameras included in the second vehicles 200-10 and the specifications of which are the same as those of the cameras included in the second vehicles 200-10. The second vehicle 200-12 may be a vehicle including a single lidar mounted at an angle of 0° with respect to the second vehicle 200-12. The lidar mounted on the second vehicle 200-12 at 0° may have a horizontal FoV of 50°, a vertical FoV of 20°, a horizontal pitch of 0.1°, a vertical pitch of 0.1°, and a maximum range of 100 meters.

The server 400 may determine detailed map data including data usable by the cameras and lidar mounted on the second vehicle 200-12, from among the found detailed map data 1500. The server 400 may determine that the number and specifications of cameras and lidars used to generate third detailed map data 1530 correspond to the number and specifications of cameras and lidars mounted on the second vehicle 200-12. The server 400 may determine, as recommended detailed map data, the third detailed map data 1530 generated using sensors corresponding to the types and specifications of sensors mounted on the second vehicles 200-12. In this example, first detailed map data 1510 and second detailed map data 1520 may not be recommended in view of the specifications of the various sensors associated therewith.

Figure 16:
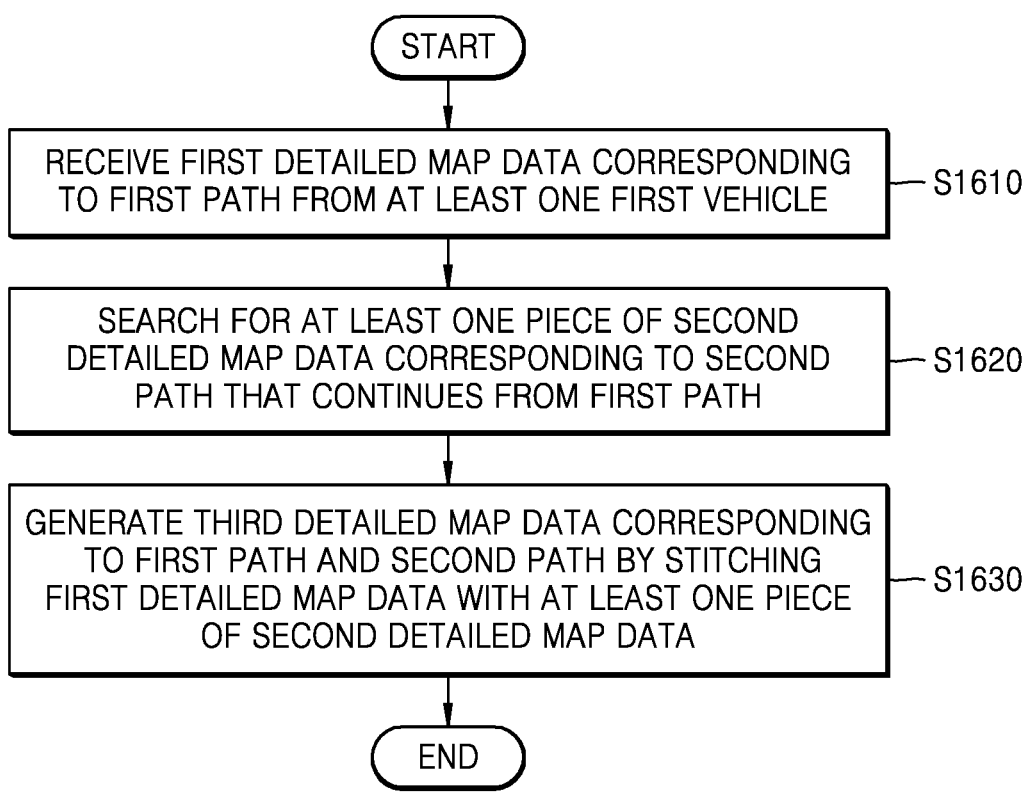
FIG. 16 is a flowchart illustrating an example method, performed by the server, of stitching detailed map data received from at least one first vehicle, according to an embodiment.

FIG. 16 is a flowchart illustrating an example method, performed by the server 400, of stitching detailed map data received from at least one first vehicle 100, according to an embodiment.

Referring to FIG. 16, in operation S1610, the server 400 may receive the first detailed map data corresponding to the first path from the at least one first vehicle 100. Operation S1610 of FIG. 16 is the same as, or similar to, a description made with reference to FIG. 11, and thus a repeated description thereof will provided here.

In operation S1620, the server 400 may search for at least one piece of second detailed map data corresponding to a second path that continues from the first path.

The server 400 may search for at least one piece of second detailed map data corresponding to the second path that continues from the first path, from among pieces of detailed map data pre-uploaded to the server 400. The second path that continues from the first path may be a path having a destination of the first path as its departure or a departure of the first path as its destination.

In operation S1630, the server 400 may generate third detailed map data corresponding to the first path and the second path by stitching the first detailed map data with the at least one piece of second detailed map data.

The third detailed map data corresponding to the first path and the second path may be detailed map data corresponding to a path from the departure of the first path to the destination of the second path. Alternatively, the third detailed map data corresponding to the first path and the second path may be detailed map data corresponding to a path from the departure of the second path to the destination of the first path.

According to an embodiment, when a plurality of pieces of second detailed map data corresponding to the second path are found, the server 400 may determine second detailed map data corresponding to the first detailed map data.

For example, the server 400 may stitch second detailed map data generated by a vehicle having the same type as the first vehicle 100 from among the found plurality of pieces of second detailed map data with the first detailed map data. As another example, the server 400 may stitch second detailed map data generated by a vehicle including sensors corresponding to the sensors mounted on the first vehicle 100 from among the found plurality of pieces of second detailed map data with the first detailed map data. As another example, the server 400 may stitch second detailed map data generated in a traveling environment corresponding to the traveling environment where the first detailed map data is generated, from among the found plurality of pieces of second detailed map data, with the first detailed map data.

The server 400 may maintain uniformity between a plurality of pieces of stitched detailed map data by stitching the second detailed map data corresponding to the first detailed map data with the first detailed map data.

According to another embodiment, the server 400 may determine one piece of second detailed map data having highest reliability from among the plurality of pieces of second detailed map data, as detailed map data that is to be stitched with the first detailed map data.

For example, the server 400 may determine one piece of second detailed map data provided by a user and having a highest score from among the plurality of pieces of second detailed map data, as the detailed map data that is to be stitched with the first detailed map data.

According to various example embodiments, the server 400 may increase diversity of held detailed map data by stitching pieces of detailed map data corresponding to consecutive sections with each other. The server 400 may generate a single global map by continuously stitching pieces of detailed map data uploaded by a plurality of users with each other. This will be described in more detail later with reference to FIGS. 21 and 22.

Figure 17:
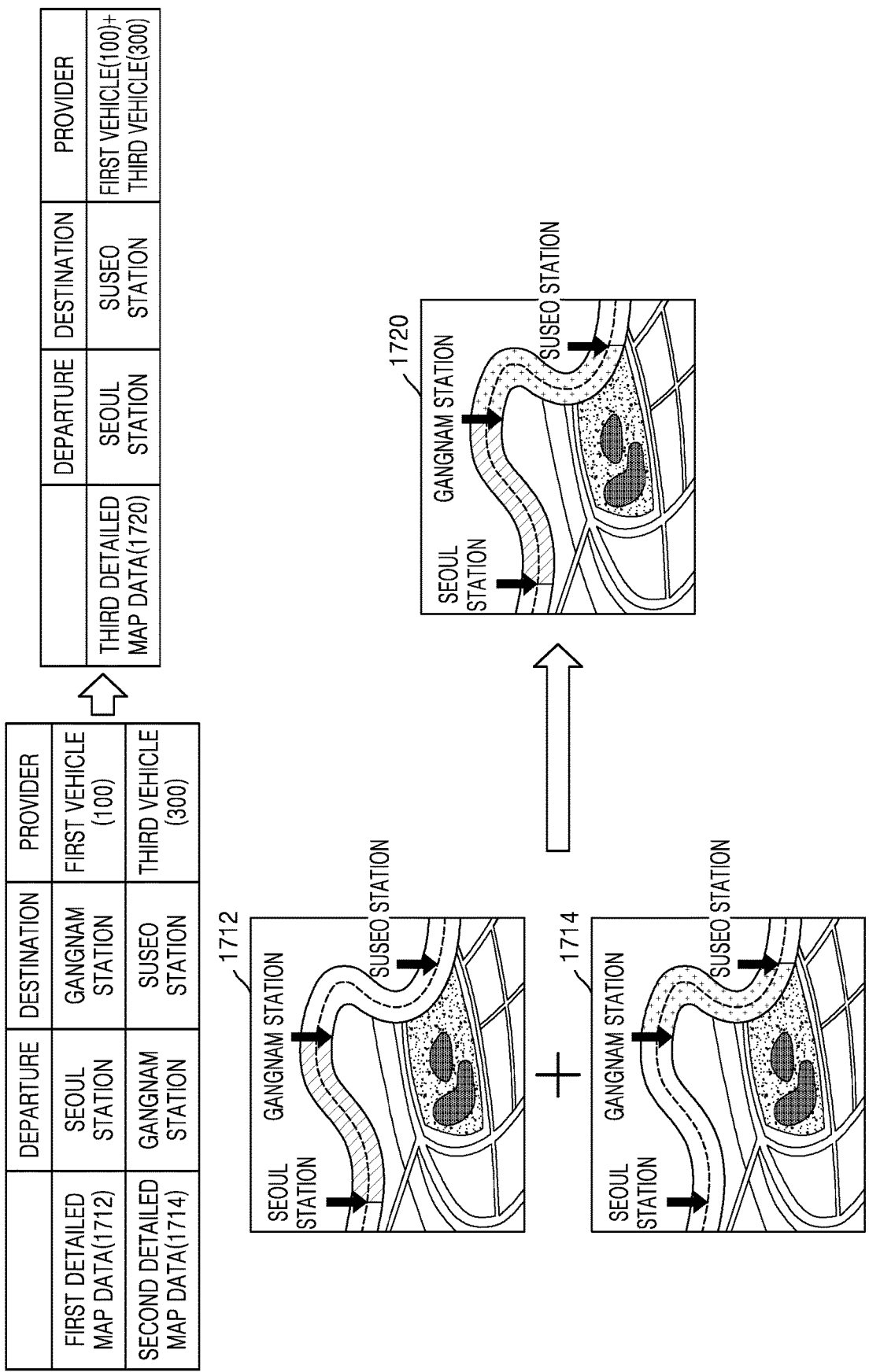
FIG. 17 is a diagram illustrating an example operation, performed by the server, of stitching detailed map data received from at least one first vehicle, according to an embodiment.

FIG. 17 is a diagram illustrating an example operation, performed by the server 400, of stitching detailed map data received from the at least one first vehicle 100, according to an embodiment.

FIG. 17 illustrates an example in which the server 400 stitches first detailed map data 1712 received from the first vehicle 100 with second detailed map data 1714 received from the third vehicle 300.

According to an embodiment, the server 400 may stitch the first detailed map data 1712 corresponding to a path from the 'Seoul station' to the 'Gangnam station' with the third detailed map data 1714 corresponding to a path from the 'Gangnam station' to the 'Suseo station'. The server 400 may generate third detailed map data 1720 from the 'Seoul station' to the 'Suseo station' by stitching the first detailed map data 1712 with the third detailed map data 1714.

Figure 18:
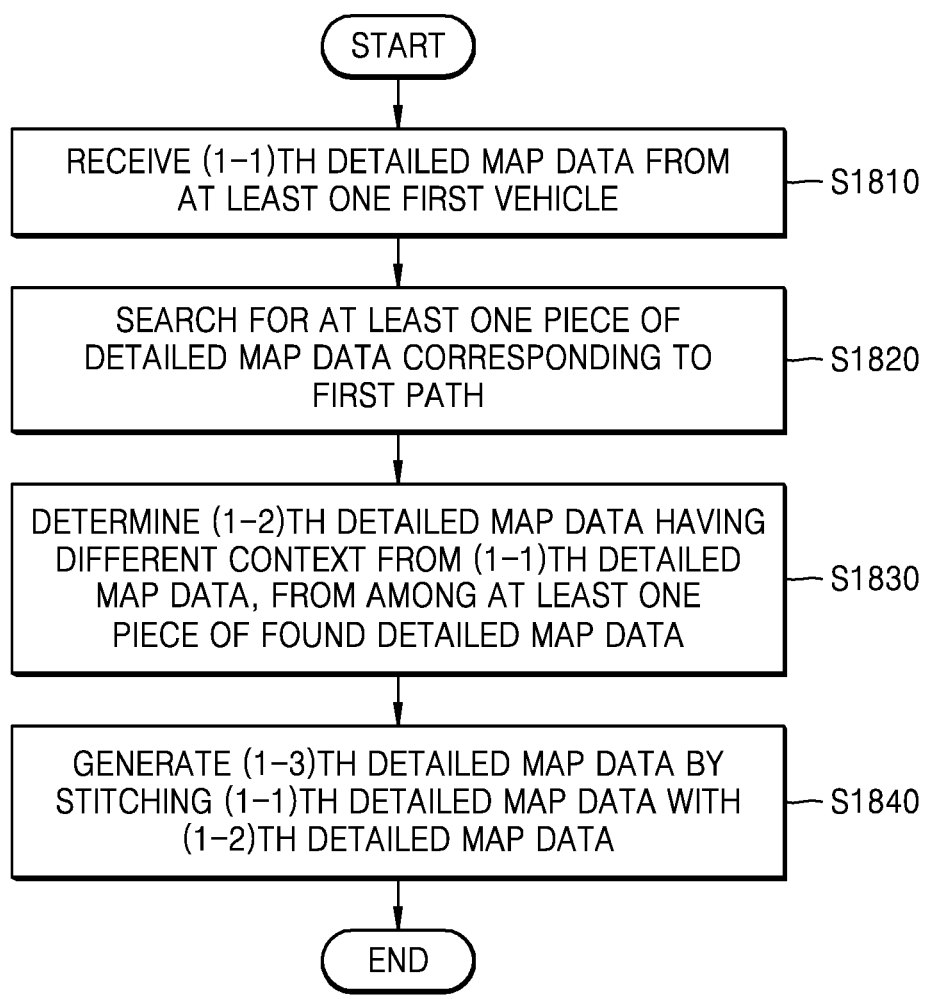
FIG. 18 is a flowchart illustrating an example method, performed by the server, of stitching detailed map data received from at least one first vehicle, according to an embodiment.

FIG. 18 is a flowchart illustrating an example method, performed by the server 400, of stitching detailed map data received from the at least one first vehicle 100, according to an embodiment.

Referring to FIG. 18, in operation S1810, the server 400 may receive (1-1)th detailed map data from the at least one first vehicle 100. Operation S1810 of FIG. 18 is the same as, or similar to, a description made with reference to FIG. 11, and thus a repeated description thereof will not be provided here.

In operation S1820, the server 400 may search for at least one piece of detailed map data corresponding to the first path. The server 400 may search for at least one piece of detailed map data corresponding to the first path from among pieces of pre-uploaded detailed map data.

In operation S1830, the server 400 may determine (1-2)th detailed map data having a different context from the (1-1)th detailed map data, from among the at least one piece of found detailed map data. 'Having a different context from the (1-1)th detailed map data' may refer, for example, to detailed map data being generated based on traveling data collected in a different traveling environment from the (1-1)th detailed map data.

For example, the server 400 may determine, as the (1-2)th detailed map data, detailed map data generated using traveling data collected in a different weather from traveling data used to generate the (1-1)th detailed map data. The server 400 may determine, as the (1-2)th detailed map data, detailed map data generated using traveling data collected at a different time zone from the traveling data used to generate the (1-1)th detailed map data. The server 400 may determine, as the (1-2)th detailed map data, detailed map data generated using traveling data collected through traveling on a different lane from the traveling data used to generate the (1-1)th detailed map data.

In operation S1840, the server 400 may generate (1-3)th detailed map data by stitching the (1-1)th detailed map data with the (1-2)th detailed map data.

According to disclosed embodiments, the server 400 may generate one piece of detailed map data that is usable in various traveling environments, through stitching between pieces of detailed map data having different contexts with respect to the same path. The server 400 may increase the completeness of detailed map data provided by each user through switching.

Figure 19:
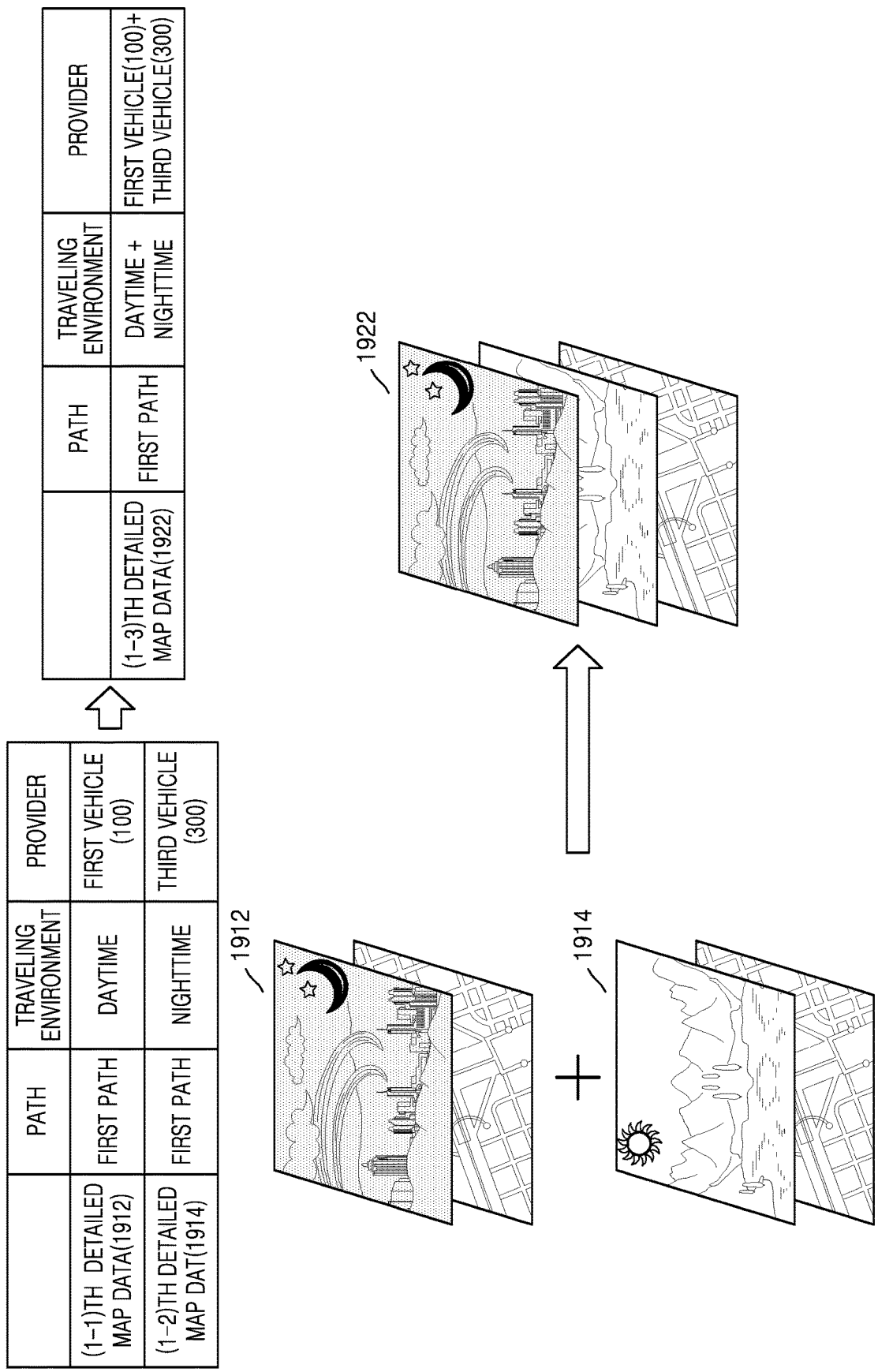
FIG. 19 is a diagram illustrating an example operation, performed by the server, of stitching detailed map data received from at least one first vehicle, according to an embodiment.

FIG. 19 is a diagram illustrating an example operation, performed by the server 400, of stitching detailed map data received from the at least one first vehicle 100, according to an embodiment.

FIG. 19 illustrates an example in which the server 400 stitches (1-1)th detailed map data 1912 received from the first vehicle 100 with (1-2)th detailed map data 1914 received from the third vehicle 300.

According to an embodiment, both the (1-1)th detailed map data 1912 and the (1-2)th detailed map data 1914 may correspond to the first path. The (1-1)th detailed map data 1912 may be detailed map data generated based on (1-1)th traveling data obtained while the first vehicle 100 is traveling the first path on a 'daytime' time zone. The (1-2)th detailed map data 1914 may be detailed map data generated based on (1-2)th traveling data obtained while the third vehicle 300 is traveling the first path on a 'nighttime' time zone.

The server 400 may generate (1-3)th detailed map data 1922 corresponding to traveling environments respectively corresponding to the 'daytime' time zone and the 'nighttime' time zone by stitching the (1-1)th detailed map data 1912 and the (1-2)th detailed map data 1914, which are generated based on pieces of traveling data respectively obtained at different time zones, with each other.

Figure 20:
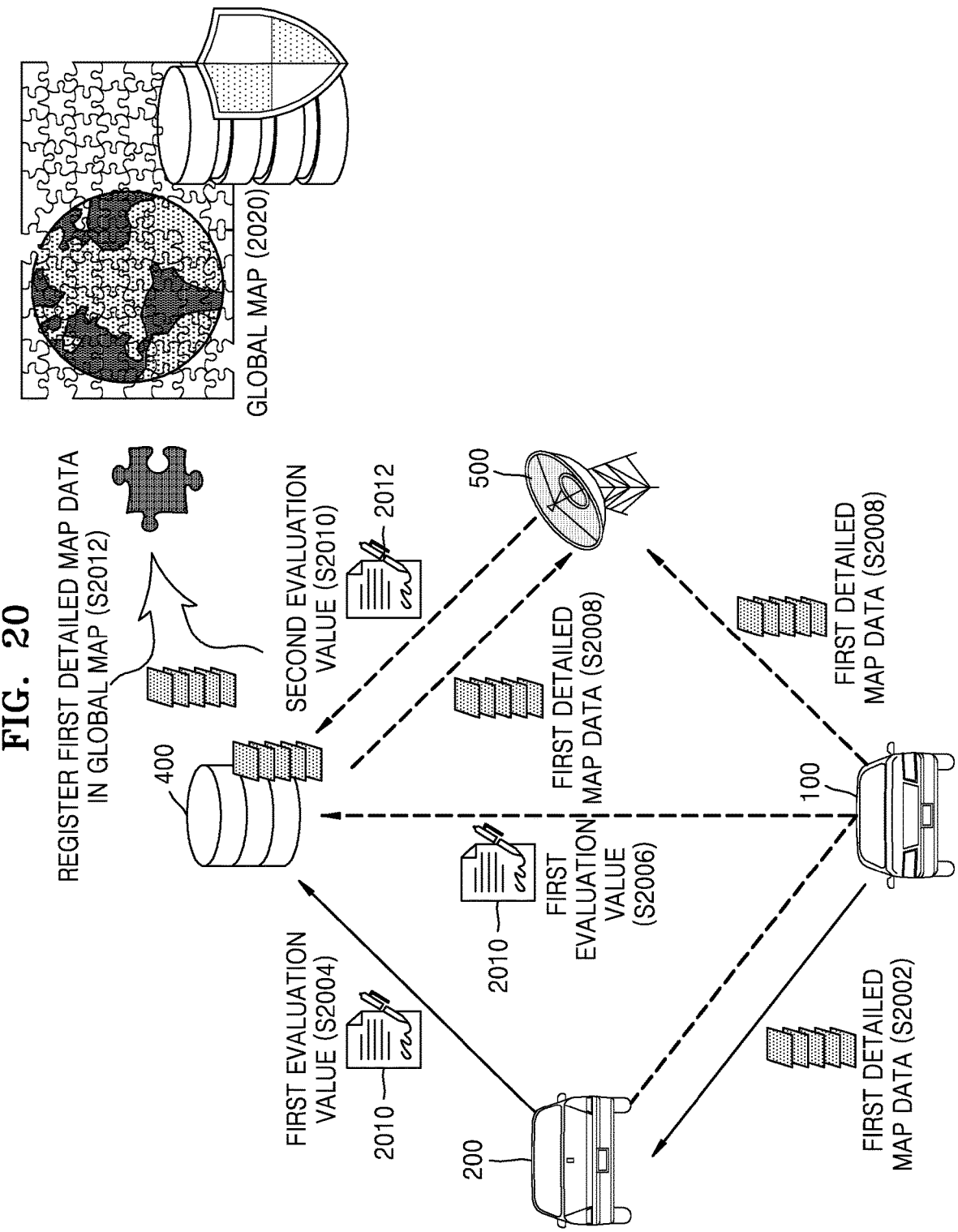
FIG. 20 is a diagram illustrating an example operation, performed by the server, of registering detailed map data obtained by the first vehicle in a global map, based on an evaluation value of the at least one second vehicle, according to an embodiment.

FIG. 20 is a diagram illustrating an example operation, performed by the server 400, of registering detailed map data obtained by the first vehicle 100 in a global map, based on an evaluation value of at least one second vehicle 200, according to an embodiment.

An important issue when detailed map data is generated and shared by a plurality of subjects may be reliability of the shared detailed map data. Because pieces of detailed map data respectively provided by a plurality of users correspond to certain paths, respectively, one piece of detailed map data capable of covering all roads around the world may be needed.

FIG. 20 illustrates an example in which the server 400 generates a global map 2020, based on pieces of detailed map data uploaded by a plurality of users. The global map 2020 may refer, for example, to one piece of global detailed map data corresponding to roads around the world.

As described above, the first vehicle 100 may obtain the first detailed map data corresponding to the path, based on the first traveling data collected while traveling the first path. The first vehicle 100 may provide the first detailed map data obtained by the first vehicle 100 directly to the second vehicle 200 via V2V communication (S2002), or may upload he first detailed map data obtained by the first vehicle 100 to the server and provide the uploaded first detailed map data to the plurality of users.

According to an embodiment, the second vehicle 200 may use the first detailed map data to autonomously travel the first path and may determine a first evaluation value 2010 of the first detailed map data. The sever 400 may provide guide information such that the at least one second vehicle 200 may determine the first evaluation value 2010 according to a uniform criterion. The sever 400 may provide the second vehicle 200 with a program including instructions for determining the first evaluation value 2010 of the first detailed map data or an application for determining the first evaluation value 2010 of the first detailed map data.

The sever 400 may obtain the first evaluation value 2010 determined by the second vehicle 200. The sever 400 may obtain the first evaluation value 2010 from the second vehicle 200 (S2004). The sever 400 may also obtain the first evaluation value 2010 from the first vehicle 100 that acquired the first evaluation value 2010 from the second vehicle 200 (S2006).

According to an embodiment, the server 400 may determine whether the first evaluation value 2010 of the second vehicle 200 with respect to the first detailed map data is equal to or greater than a threshold value. The threshold value may be obtained as a result of machine learning of the server 400 or may be determined according to the rules between the server 400 and a plurality of users.

According to an embodiment, the server 400 may determine whether the first evaluation value 2010 of the second vehicle 200 with respect to the first detailed map data is equal to or greater than a threshold value. When the first verification value 2010 is equal to or greater than the threshold value, the server 400 may register the first detailed map data received from the first vehicle 100 or the second vehicle 200 in the global map 2020 (S2012).

For example, the server 400 registering the first detailed map data in the global map 2020 may mean storing the first detailed map data in a database for the global map 2020. As another example, the server 400 registering the first detailed map data in the global map 2020 may mean stitching the first detailed map data with other detailed map data pre-registered in the global map 2020, the other detailed map data corresponding to a path that continues from the first path.

According to another embodiment, the server 400 may determine whether the number of second vehicles 200 that provided the first evaluation value 200 equal to or greater than the threshold value is equal to or greater than a certain number of second vehicles 200. When the number of second vehicles 200 that provided the first evaluation value 200 equal to or greater than the threshold value is equal to or greater than the certain number of second vehicles 200, the server 400 may register the first detailed map data received from the first vehicle 100 or at least one second vehicle 200 in the global map 2020.

According to another embodiment, an infrastructure 500 (for example, traffic lights, a CCTV, and a base station) located on the first path may obtain the first detailed map data from the first vehicle 100 or the server 400 (S2008). The infrastructure 500 may determine a second evaluation value 2012 for the first detailed map data. The server 400 may obtain the second evaluation value 2012 for the first detailed map data from the infrastructure 500 (S2012). The server 400 may determine whether to register the first detailed map data in the global map 2020, by additionally considering whether the second verification value 2012 is equal to or greater than a certain threshold value.

According to an embodiment, the server 400 may stitch the first detailed map data corresponding to the first path with other detailed map data pre-registered in the global map 2020, the other detailed map data corresponding to a path that continues from the first path.

Figure 21:
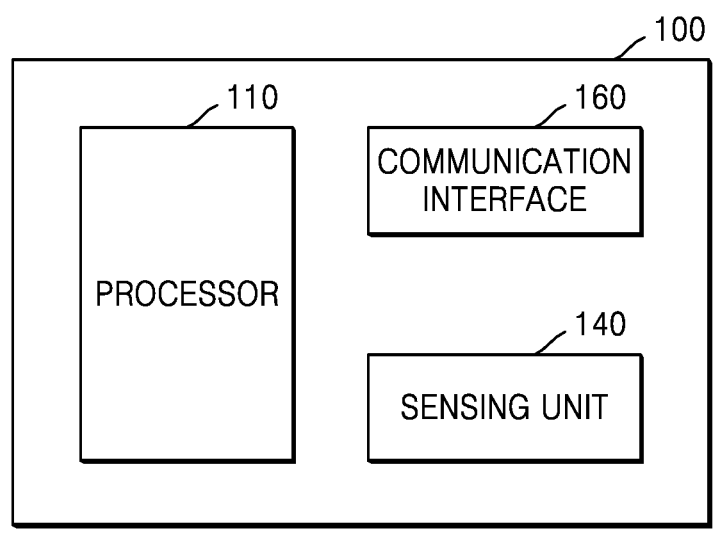
FIG. 21 is a block diagram illustrating an example structure of the first vehicle, according to an embodiment.
Figure 22:
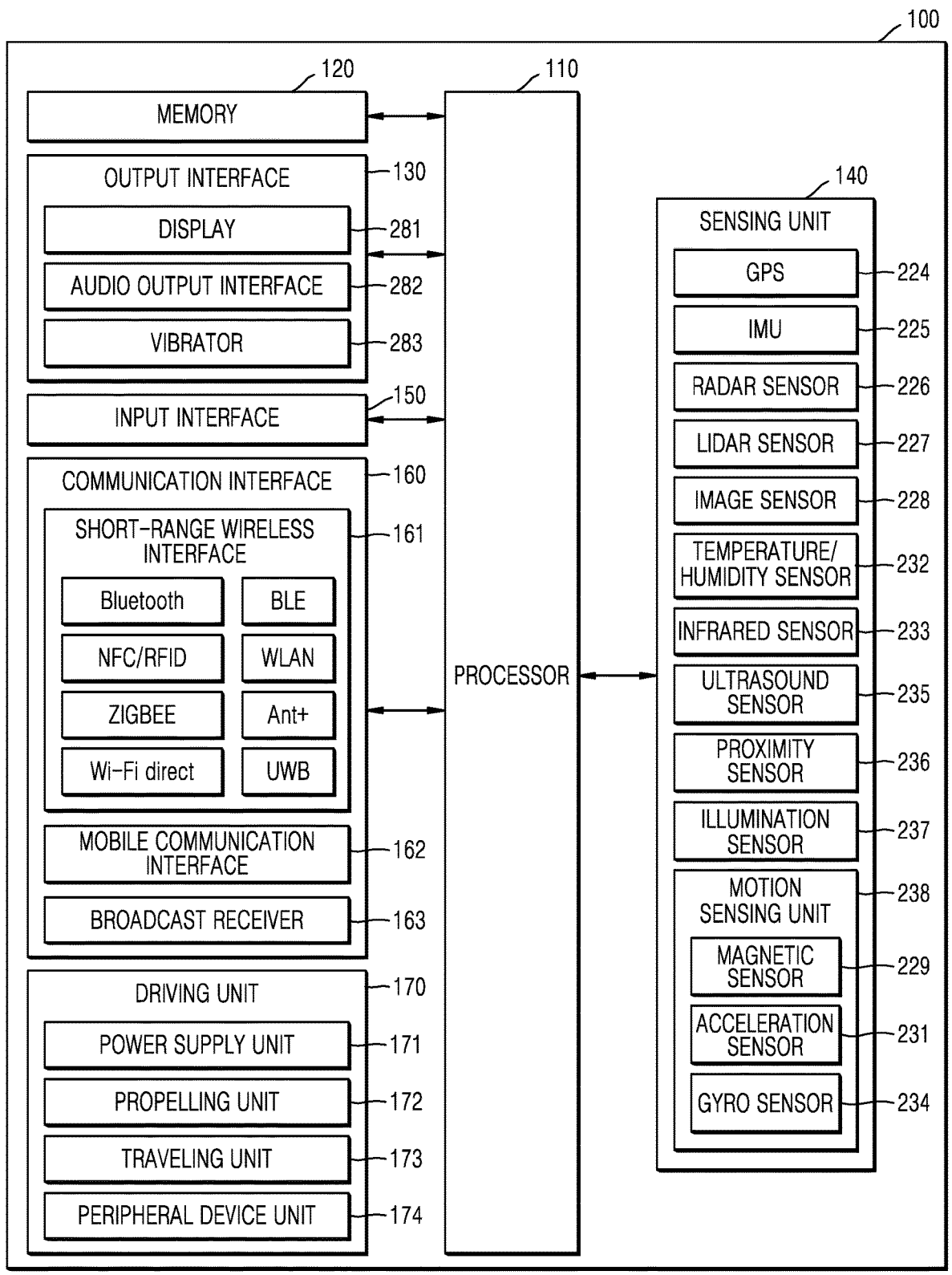
FIG. 22 is a block diagram illustrating an example structure of the first vehicle, according to an embodiment.

FIGS. 21 and 22 are block diagrams illustrating an example structure of the first vehicle 100, according to an embodiment.

Referring to FIG. 21, the first vehicle 100 according to an embodiment may include a processor (e.g., including processing circuitry) 110, a communication interface (e.g., including communication circuitry) 160, and a sensing unit (including at least one sensor and/or sensing circuitry) 140. All of the components illustrated in FIG. 21 are not essential components of the first vehicle 100. More or less components than those illustrated in FIG. 21 may be included in the first vehicle 100.

For example, as shown in FIG. 22, the first vehicle 100 may further include a memory 120, an output interface (e.g., including output circuitry) 130, and an input interface (e.g., including input circuitry) 150 in addition to the processor 110, the communication interface 160, and the sensing unit 140.

The sensing unit 140 may include a plurality of sensors configured to sense information about a surrounding environment of the first vehicle 100, and may include one or more actuators configured to correct locations and/or orientations of the sensors. For example, the sensing unit 140 may include, for example, and without limitation, a GPS 224, an IMU 225, a RADAR sensor 226, an LIDAR sensor 227, an image sensor 228, or the like.

According to an embodiment, the image sensor 228 may include, for example, and without limitation, a camera, a stereo camera, a mono camera, a wide-angle camera, a 3D vision camera, or the like.

The sensing unit 140 may include, for example, and without limitation, at least one of a temperature/humidity sensor 232, an infrared sensor 233, an ultrasound sensor 235, a proximity sensor 236, an illumination sensor 237, or the like, but embodiments are not limited thereto. For example, the sensing unit 140 may include an atmospheric pressure sensor and a dust sensor.

The sensing unit 140 may be configured as a combination of the image sensor 228 and the RADAR sensor 226 or a combination of the image sensor 228 and the LIDAR sensor 227. Functions of most of the sensors would be instinctively understood by one of ordinary skill in the art in view of their names and thus detailed descriptions thereof will not be provided here.

The sensing unit 140 may also include a motion sensing unit 238 configured to sense a movement of the first vehicle 100. The motion sensing unit 238 may include, for example, and without limitation, a magnetic sensor 229, an acceleration sensor 231, a gyro sensor 234, or the like.

The GPS 224 may be a sensor configured to estimate a geographical position of the first vehicle 100. In other words, the GPS 224 may include a transceiver configured to estimate a position of the first vehicle 100 with respect to the earth.

The IMU 225 may be a combination of sensors configured to sense position and orientation variations of the first vehicle 100, based on inertial acceleration. For example, the combination of sensors may include accelerometers and gyroscopes.

The RADAR sensor 226 may be a sensor configured to sense objects within an environment where the first vehicle 100 is located, using a wireless signal. The RADAR sensor 226 may also be configured to sense speeds and/or directions of objects.

The LIDAR sensor 227 may be a sensor configured to analyze light reflected by an object and measure a distance from the object, by usually using near infrared (NIR). Data measured by the LIDAR sensor 227 may be used to realize a 3D image. According to an embodiment, the LIDAR sensor 227 may be a sensor configured to sense the objects within the environment where the first vehicle 100 is located, using laser. In more detail, the LIDAR sensor 227 may include a laser light source and/or laser scanner configured to emit laser, and a detector configured to detect reflection of the laser. The LIDAR sensor 227 may be configured to operate in a coherent (e.g., using heterodyne detection) or incoherent detection mode.

The image sensor 228 may be a still camera or video camera configured to record an external environment of the first vehicle 100. For example, the image sensor 228 may include a plurality of cameras, and the plurality of cameras may be arranged at a plurality of locations inside or outside the first vehicle 100.

The ultrasound sensor 235 may be a sensor configured to sense obstacles located within a short distance from the first vehicle 100 using an echo signal fed back by outputting ultrasound.

According to an embodiment, the sensing unit 140 may collect traveling data about the first path while the first vehicle 100 is traveling the first path. For example, the sensing unit 140 may obtain first traveling data including images of a road, an infrastructure, and a surrounding environment on the first path travelled by the first vehicle 100, detection data, and measurement data, using at least one of the aforementioned various types of sensors.

The memory 120 may, for example, and without limitation, be a magnetic disk drive, an optical disk drive, a flash memory, or the like. The memory 120 may be a portable USB data storage device. The memory 120 may store system software for executing examples related with the present application. The system software for executing examples related with the present application may be stored in a portable storage medium.

The communication interface 160 may include various communication circuitry, including, for example and without limitation, at least one antenna for communicating with other devices wirelessly. According to an embodiment, the communication interface 160 may include a wireless communication interface. For example, the communication interface 160 may include, but is not limited to, a short-range wireless communication interface 161 (e.g., including various communication circuitry, such as, for example, and without limitation, a Bluetooth communicator, a BLE communicator, a short-range wireless communicator (NFC/RFID communicator), a WLAN (Wi-Fi) communicator, a ZigBee communicator, an IrDA communicator, a Wi-Fi Direct (WFD) communicator, a UWB communicator, and an Ant+ communicator), a mobile communication interface (e.g., including mobile communication circuitry) 162 (e.g., 2G, 3G, 4G, or LTE), and a broadcast receiver (e.g., including broadcast receiving circuitry) 163.

According to an embodiment, the communication interface 160 may provide the first traveling data about the first path collected by the first vehicle 100 to an external device. The communication interface 160 may receive traveling data about a path included in the first path, the traveling data collected by an external device.

According to an embodiment, the communication interface 160 may provide the first detailed map data obtained by the first vehicle 100 to an external device. The at least one external device may include an external vehicle, an external server, and an external mobile device.

The communication interface 160 may perform V2V communication with the second vehicle 200 located within a certain distance from the first vehicle 100. For example, the communication interface 160 may broadcast or advertise information about the first detailed map data. As the communication interface 160 receives a request for the first detailed map data from the second vehicle 200, the communication interface 160 may transmit the first detailed map data to the second vehicle 200.

According to another embodiment, the communication interface 160 may perform communication for uploading the first detailed map data to the server 400, with the server 400. The communication interface 160 may request the server 400 to approve uploading of the first detailed map data. When uploading of the first detailed map data is approved by the server 400, the communication interface 160 may transmit the first detailed map data to the server 400.

The input interface 150 include various input circuitry via which data for controlling the first vehicle 100 is input. For example, the input interface 150 may be, but is not limited to, a key pad, a dome switch, a touch pad (e.g., a capacitive overlay type, a resistive overlay type, an infrared beam type, an integral strain gauge type, a surface acoustic wave type, a piezo electric type, or the like), a jog wheel, and/or a jog switch. The input interface 150 may include a microphone, and accordingly the microphone may be configured to receive an audio (for example, an audio command) from a user of the first vehicle 100.

The output interface 130 may include various output circuitry and output an audio signal or a video signal, and may include, for example, and without limitation, a display 281, an audio output interface 282, and a vibrator 283.

The display 281 may include, for example, and without limitation, at least one of a liquid crystal display (LCD), a thin film transistor-LCD (TFT-LCD), an organic light-emitting diode (OLED), a flexible display, a 3D display, and an electrophoretic display. According to embodiments of the output interface 130, the output interface 130 may include two or more displays 281.

The audio output interface 282 outputs audio data that is received from the communication interface 160 or stored in the memory 120. The audio output interface 282 may include, for example, a speaker and a buzzer.

The vibrator 283 may generate a physical vibration using electrical energy.

The input interface 150 and the output interface 130 may include network interfaces, and may be implemented using a touch screen.

The driving unit 170 may include configurations including various circuitry and apparatus used for driving (running) the first vehicle 100 and for operating devices inside the first vehicle 100. The driving unit 170 may include at least one of a power supply unit 171, a propelling unit 172, a traveling unit 173, and a peripheral device unit 174, but is not limited thereto. The traveling unit 173 may include, but is not limited to, a break unit, a steering unit, and a throttle.

The peripheral device unit 174 may include a navigation system, a light, a turn signal light, a wiper, an internal light, a heater, and an air conditioner. The navigation system may be a system configured to determine a running route of the first vehicle 100. The navigation system may be configured to dynamically update the running route while the first vehicle 100 is traveling. For example, the navigation system may utilize data collected by the GPS 224 to determine the running route of the first vehicle 100.

The processor 110 may include various processing circuitry and control the sensing unit 140, the communication interface 160, the input interface 150, the memory 120, and the output interface 130 by executing the programs stored in the memory 120. The processor 110 may include one or more processors.

The processor 110 according to an embodiment may obtain the first detailed map data corresponding to the first path, based on the first traveling data collected by the sensing unit 140. The processor 110 may configure the first detailed map data such that information about the at least one first sensor used to collect the first traveling data is included in the first detailed map data.

The processor 110 according to an embodiment may determine the reliability of the first detailed map data. The processor 110 may determine the reliability of the first detailed map data, based on the second traveling data collected at the second time point different from the first time point when the first traveling data was collected. For example, the processor 110 may determine a similarity between the second traveling data and traveling data predicted by the first detailed map data. The processor 110 may determine the reliability of the first detailed map data, based on the determined similarity.

When the reliability of the first detailed map data is less than a threshold value, the processor 110 may update the first detailed map data, based on the second traveling data. On the other hand, when the reliability of the first detailed map data is equal to or greater than the threshold value, the processor 110 may control the communication interface 160 to provide the first detailed map data to at least one external device.

The processor 110 according to an embodiment may control the communication interface 160 to broadcast information about the first detailed map data. The information about the first detailed map data may include information necessary for determining whether the second vehicle 200 that is to receive the first detailed map data needs the first detailed map data.

For example, the information about the first detailed map data may include information about which path the first detailed map data is about, information of a sensor used to generate the first detailed map data (for example, the type of a sensor, the number of sensors, and the specification of the sensor), and information about the reliability of the first detailed map data. The information about the first detailed map data may include generation history information about the first detailed map data.

The processor 110 may control the communication interface 160 to receives a request for the first detailed map data from at least one second vehicle 200 that is traveling within a certain distance from the first vehicle 100. The processor 110 may control the communication interface 160 to transmit the first detailed map data to the second vehicle 200.

The processor 110 may control the communication interface 160 to request information about at least one second sensor mounted on the second vehicle 200. The information about the at least one second sensor may include information about the type of at least one second sensor mounted on the second vehicle 200, the number of second sensors for each type, a location on which each second sensor is mounted, and the specification of each second sensor.

The processor 110 may process the first detailed map data, based on the information about the at least one second sensor. The processor 110 may control the communication interface 160 to transmit the processed first detailed map data to the second vehicle 200.

According to an embodiment, the processor 110 may be requested by the at least one second vehicle 200 to provide detailed map data corresponding to the second path. The processor 110 may determine whether the first path is a path including the second path, by comparing the first path and the second path with each other. When the second path is included in the first path, the processor 110 may transmit the first detailed map data corresponding to the first path to the second vehicle 200.

The processor 110 may process the first detailed map data to include only detailed map data corresponding to the second path, and may transmit the processed first detailed map data to the second vehicle 200.

According to an embodiment, the processor 110 may control the communication interface 160 to request the server 400 to approve uploading of the first detailed map data. When uploading of the first detailed map data is approved by the server 400, the processor 160 may control the communication interface 160 to transmit the first detailed map data to the server 400.

Figure 23:
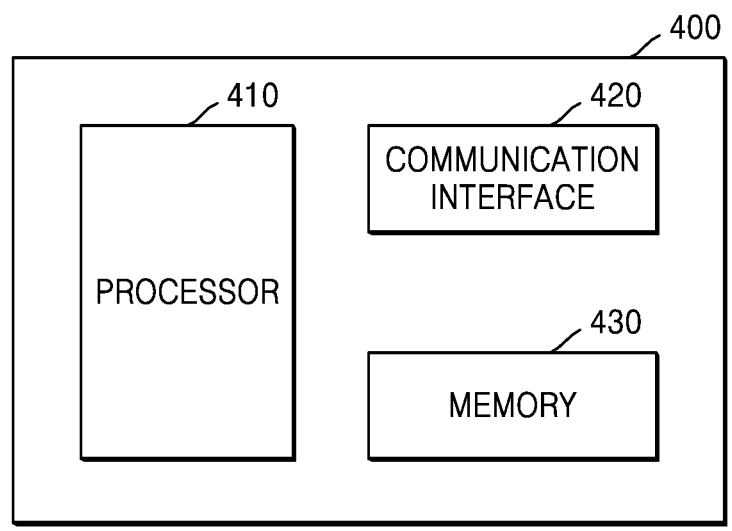
FIG. 23 is a block diagram illustrating an example structure of the server, according to an embodiment.

FIG. 23 is a block diagram illustrating an example structure of the server 400 according to an embodiment.

Referring to FIG. 23, the server 400 may include a processor (e.g., including processing circuitry) 410, a communication interface (e.g., including communication circuitry) 420, and a memory 430. All of the components illustrated in FIG. 23 are not essential components of the server 400. More or less components than those illustrated in FIG. 23 may be included in the server 400.

The communication interface 420 may include various communication circuitry, including at least one antenna for communicating with other devices wirelessly. According to an embodiment, the communication interface 420 may include a wireless communication interface. For example, the communication interface 420 may include, but is not limited to, a short-range wireless communicator including various short-range wireless communication circuitry (e.g., a Bluetooth communicator, a BLE communicator, a short-range wireless communicator (NFC/RFID communicator), a WLAN (Wi-Fi) communicator, a ZigBee communicator, an IrDA communicator, a WFD communicator, a UWB communicator, and an Ant+ communicator) and a mobile communicator (e.g., 2G, 3G, 4G, or LTE).

According to an embodiment, the communication interface 420 may receive from the first vehicle 100 a request to upload the first detailed map data corresponding to the first path. The communication interface 420 may approve of the uploading request from the first vehicle 100, under the control of the processor 410. The communication interface 420 may receive the first detailed map data corresponding to the first path from the first vehicle 100, under the control of the processor 410.

According to an embodiment, the communication interface 420 may receive from the second vehicle 200 a request to provide detailed map data corresponding to the first path. The communication interface 420 may transmit a list of at least one piece of recommended detailed map data to the second vehicle 200, under the control of the processor 410. The communication interface 420 may transmit the detailed map data requested by the second vehicle 200 to the second vehicle 200.

The processor 410 may include various processing circuitry and control the communication interface 420 and the memory 430 by executing the programs stored in the memory 430. The processor 410 may include one or more processors.

According to an embodiment, the processor 410 may determine whether to approve uploading of the first detailed map data, based on a certain criterion.

For example, the processor 410 may determine the reliability of the first vehicle 100 based on detailed map data previously uploaded by the first vehicle 100. The processor 410 may determine whether to approve uploading of the first detailed map data, based on whether the determined reliability of the first vehicle 100 is equal to or greater than a threshold value.

The processor 410 may search for detailed map data corresponding to the first path from the memory 430. The processor 410 may determine the number of pieces of detailed map data corresponding to the first path previously uploaded to the server 400, based on a result of the searching. The processor 410 may determine whether to approve uploading of the first detailed map data, based on the number of pieces of detailed map data corresponding to the first path previously uploaded to the server 400.

The processor 410 may compare the reliability of the first detailed map data with the reliability of detailed map data corresponding to the first path previously uploaded to the server 400. The processor 410 may determine whether to approve uploading of the first detailed map data, based on a result of the comparison between the reliability of the first detailed map data and the reliability of detailed map data corresponding to the first path previously uploaded to the server 400.

The processor 410 may control the communication interface 420 to receive the first detailed map data from the first vehicle 100. The processor 410 may store the received first detailed map data in the memory 430.

According to an embodiment, the processor 410 may provide detailed map data to the second vehicle 200.

When a request to provide detailed map data corresponding to the first path is requested by the second vehicle 200, the processor 410 may search for the detailed map data corresponding to the first path from the memory 430. The processor 410 may determine at least one piece of recommended detailed map data from among the pieces of found detailed map data according to a certain criterion. The processor 410 may control the communication interface 420 to transmit a list of at least one piece of recommended detailed map data to the second vehicle 420.

The processor 410 may receive from the second vehicle 200 a request to provide one of the recommended at least one piece of detailed map data. The processor 410 may control the communication interface 420 to transmit the requested detailed map data to the second vehicle 200.

A method according to an embodiment of the disclosure may be embodied as program commands executable by various computer means and may be recorded on a computer-readable recording medium. The computer-readable recording medium may include program commands, data files, data structures, and the like separately or in combinations. The program commands to be recorded on the computer-readable recording medium may be specially designed and configured for embodiments or may be well-known to and be usable by one of ordinary skill in the art of computer software. Examples of the computer-readable recording medium include a magnetic medium such as a hard disk, a floppy disk, or a magnetic tape, an optical medium such as a compact disk-read-only memory (CD-ROM) or a digital versatile disk (DVD), a magneto-optical medium such as a floptical disk, and a hardware device specially configured to store and execute program commands such as a ROM, a random-access memory (RAM), or a flash memory. Examples of the program commands are advanced language codes that can be executed by a computer using an interpreter or the like as well as machine language codes made by a compiler.

Some embodiments may also be embodied as a storage medium including instruction codes executable by a computer such as a program module executed by the computer. A computer readable medium can be any available medium which can be accessed by the computer and includes all volatile/non-volatile and removable/non-removable media. Further, the computer readable medium may include all computer storage and communication media. The computer storage medium includes all volatile/non-volatile and removable/non-removable media embodied by a certain method or technology for storing information such as computer readable instruction code, a data structure, a program module or other data. The communication medium typically includes the computer readable instruction code, the data structure, the program module, or other data of a modulated data signal, or other transmission mechanism, and includes any information transmission medium. Some embodiments may be implemented as a computer program or a computer program product including instructions executable by a computer.

While one or more example embodiments have been illustrated and described with reference to the figures, it will be understood by those of ordinary skill in the art that various changes in form and details may be made therein without departing from the spirit and scope as defined, for example, by the following claims.

What is claimed is:

1. A method, performed by a processing system including a processor and memory of a first vehicle, of providing map data, the method comprising:
   collecting first traveling data about a first path using at least one first sensor of the first vehicle while the first vehicle is traveling the first path at a first time point;
   obtaining first map data corresponding to the first path based on the first traveling data about the first path;
   collecting second traveling data about the first path using the at least one first sensor while the first vehicle is traveling the first path at a second time point different from the first time point;
   obtaining third traveling data predicted to be obtained while traveling the first path at the second time point using the first map data;
   determining a reliability of the first map data based on a similarity between the second traveling data and the third traveling data; and
   providing the first map data to at least one external device based on the reliability being equal to or greater than a threshold value,
   wherein the providing of the first map data to the at least one external device comprises:
   broadcasting information about the first map data, wherein the information about the first map data includes information related to the first path and information related to the at least one first sensor;
   receiving a request for the first map data from at least one second vehicle traveling within a certain distance of the first vehicle; and
   transmitting the first map data to the at least one second vehicle,
   wherein the transmitting of the first map data to the at least one second vehicle comprises:
   requesting, from the at least one second vehicle, information about at least one second sensor mounted on the at least one second vehicle;
   receiving the information about the at least one second sensor from the at least one second vehicle;
   determining, based on the information about the at least one second sensor, that the number of types of the at least one first sensor mounted on the first vehicle is less than the number of types of the at least second sensor mounted on the second vehicle;
   processing the first map data based on the information about the at least one second sensor such that the first map data utilizes types of sensors further included in the at least one second sensor; and
   providing the processed first map data to the at least one second vehicle.

2. The method of claim 1, wherein the first path includes a path along which the first vehicle has repeatedly traveled a threshold number of times or more.

3. The method of claim 1, wherein the first map data includes information about the at least one first sensor used to collect the first traveling data.

4. The method of claim 1, wherein the providing of the first map data to the at least one external device comprises, based on the reliability being less than the threshold value, updating the first map data based on the second traveling data.

5. The method of claim 1, wherein the providing of the first map data to the at least one external device comprises:
   receiving a request for map data corresponding to a second path from at least one second vehicle via short-range communication;
   comparing the second path with the first path; and
   providing the first map data corresponding to the first path to the at least one second vehicle based on the second path being included in the first path.

6. The method of claim 1, wherein the providing of the first map data to the at least one external device comprises:
   transmitting a request to approve uploading of the first map data to an external server; and
   providing the first map data to the external server based on uploading of the first map data being approved by the external server.

7. A first vehicle comprising:
   a communication interface comprising communication circuitry configured to communicate with at least one external device;
   at least one first sensor configured to collect traveling data while the first vehicle is traveling; and
   at least one processor configured to:
   receive first traveling data, from the at least one first sensor, about a first path traveled at a first time point by the first vehicle;
   obtain first map data corresponding to the first path based on the first traveling data about the first path;
   receive second traveling data, from the at least one first sensor, about the first path traveled at a second time point by the first vehicle, wherein the second time point different from the first time point;
   obtain third traveling data predicted to be obtained while traveling the first path at the second time point using the first map data;
   determine a reliability of the first map data based on a similarity between the second traveling data and the third traveling data; and
   control the communication interface to provide the first map data to at least one external device based on the reliability being equal to or greater than a threshold value,
   broadcast, via the communication interface, information about the first map data, wherein the information about the first map data includes information related to the first path and information related to the sensor unit;
   receive, via the communication interface, a request for the first map data from at least one second vehicle traveling within a certain distance of the first vehicle; and
   transmit, via the communication interface, the first detailed map data map data to the at least one second vehicle,
   request, from the at least one second vehicle, information about at least one second sensor mounted on the at least one second vehicle;
   receive the information about the at least one second sensor from the at least one second vehicle; and
   determine, based on the information about the at least one second sensor, that the number of types of the at least one first sensor mounted on the first vehicle is less than the number of types of the at least second sensor mounted on the second vehicle;
   process the first map data based on the information about the at least one second sensor such that the first map data utilizes types of sensors further included in the at least one second sensor; and
   provide the processed first map data to the at least one second vehicle.

8. The first vehicle of claim 7, wherein the first path includes a path along which the first vehicle has repeatedly traveled a threshold number of times or more.

9. The first vehicle of claim 7, wherein the first map data includes information about the at least one first sensor used to collect the first traveling data.

10. The first vehicle of claim 7, wherein the at least one processor is configured to update the first map data based on the second traveling data based on the reliability being less than the threshold value.

11. The first vehicle of claim 7, wherein the at least one processor is further configured to:
   receive a request for map data corresponding to a second path from at least one second vehicle via short-range communication;
   compare the second path with the first path; and
   provide the first map data corresponding to the first path to the at least one second vehicle based on the second path being included in the first path.

12. The first vehicle of claim 7, wherein the at least one processor is configured to control the communication interface to transmit, to an external server, a request to approve uploading of the first map data, and to transmit the first map data to the external server based on the uploading of the first map data being approved.

13. A computer program product including a non-transitory computer-readable recording medium having recorded thereon a computer program, which, when executed by a computer, causes the computer to:
   collect first traveling data about a first path using at least one first sensor of a first vehicle while the first vehicle is traveling the first path at a first time point;
   obtain first map data corresponding to the first path based on the first traveling data about the first path;
   collect second traveling data about the first path using the at least one first sensor while the first vehicle is traveling the first path at a second time point different from the first time point;
   obtain third traveling data predicted to be obtained while traveling the first path at the second time point using the first map data;
   determine a reliability of the first map data based on a similarity between the second traveling data and the third traveling data; and
   provide the first map data to at least one external device based on the reliability being equal to or greater than a threshold value,
   wherein the providing of the first map data to the at least one external device comprises:
   broadcasting information about the first map data, wherein the information about the first map data includes information related to the first path and information related to the at least one first sensor;
   receiving a request for the first map data from at least one second vehicle traveling within a certain distance of the first vehicle; and
   transmitting the first map data to the at least one second vehicle,
   wherein the transmitting of the first map data to the at least one second vehicle comprises:
   requesting, from the at least one second vehicle, information about at least one second sensor mounted on the at least one second vehicle;
   receiving the information about the at least one second sensor from the at least one second vehicle; and
   determining, based on the information about the at least one second sensor, that the number of types of the at least one first sensor mounted on the first vehicle is less than the number of types of the at least second sensor mounted on the second vehicle;
   processing the first map data based on the information about the at least one second sensor such that the first map data utilizes types of sensors further included in the at least one second sensor; and
   providing the processed first map data to the at least one second vehicle.

\* \* \* \* \*